(12) United States Patent
Hattori et al.

(10) Patent No.: US 10,652,449 B2
(45) Date of Patent: May 12, 2020

(54) INFORMATION PROCESSING APPARATUS, INFORMATION PROCESSING METHOD, AND PROGRAM

(71) Applicant: SONY CORPORATION, Tokyo (JP)

(72) Inventors: Hironori Hattori, Tokyo (JP); Yusuke Shinohe, Tokyo (JP); Takuya Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/081,561

(22) PCT Filed: Mar. 8, 2017

(86) PCT No.: PCT/JP2017/009157
§ 371 (c)(1),
(2) Date: Aug. 31, 2018

(87) PCT Pub. No.: WO2017/154953
PCT Pub. Date: Sep. 14, 2017

(65) Prior Publication Data
US 2019/0089886 A1     Mar. 21, 2019

Related U.S. Application Data

(60) Provisional application No. 62/305,313, filed on Mar. 8, 2016.

(51) Int. Cl.
*H04N 5/232* (2006.01)
*G06T 7/80* (2017.01)

(52) U.S. Cl.
CPC .............. *H04N 5/232* (2013.01); *G06T 7/80* (2017.01); *H04N 5/23206* (2013.01); *H04N 5/23296* (2013.01); *H04N 5/23299* (2018.08)

(58) Field of Classification Search
CPC .............. H04N 5/232; H04N 5/23299; H04N 5/23296; H04N 5/23206; G06T 7/80
See application file for complete search history.

(56) References Cited

U.S. PATENT DOCUMENTS

2007/0058046 A1   3/2007 Kagei
2008/0129825 A1*  6/2008 DeAngelis ............. H04N 5/232
                                                                    348/169

(Continued)

FOREIGN PATENT DOCUMENTS

JP        10-304242 A    11/1998
JP        2002-185837 A   6/2002

(Continued)

OTHER PUBLICATIONS

International Search Report dated May 9, 2017, in PCT/JP2017/009157, filed Mar. 8, 2017.

*Primary Examiner* — Jason A Flohre
(74) *Attorney, Agent, or Firm* — Oblon, McClelland, Maier & Neustadt, L.L.P.

(57) ABSTRACT

The present disclosure relates to an information processing apparatus, an information processing method, and a program making it possible to achieve camerawork corresponding to changes in various conditions when controlling multiple robot cameras.
Position information about a subject is acquired, timing information indicating a passage of time is acquired, and on a basis of the timing information and the position information about the subject, camerawork control information controlling the camerawork of an image capture apparatus that captures the subject is generated. The present disclosure is applicable to a switcher apparatus that controls multiple robot cameras.

11 Claims, 23 Drawing Sheets

(56) References Cited

U.S. PATENT DOCUMENTS

| | | | | |
|---|---|---|---|---|
| 2009/0284601 A1* | 11/2009 | Eledath | ................ | H04N 5/232 |
| | | | | 348/157 |
| 2010/0026809 A1* | 2/2010 | Curry | .................... | H04N 5/222 |
| | | | | 348/157 |
| 2010/0066862 A1* | 3/2010 | Kwag | .................... | H04N 5/262 |
| | | | | 348/231.99 |
| 2010/0189408 A1* | 7/2010 | Itoh | ....................... | H04N 5/222 |
| | | | | 386/278 |
| 2011/0090344 A1* | 4/2011 | Gefen | .................... | H04N 5/232 |
| | | | | 348/169 |
| 2013/0314547 A1 | 11/2013 | Watanabe | | |
| 2016/0112652 A1* | 4/2016 | David | ............... | H04N 5/23293 |
| | | | | 348/239 |
| 2017/0053439 A1* | 2/2017 | Honda | ................... | G06F 17/50 |

FOREIGN PATENT DOCUMENTS

| | | |
|---|---|---|
| JP | 2002-314851 A | 10/2002 |
| JP | 2003-18448 A | 1/2003 |
| JP | 2003-348384 A | 12/2003 |
| JP | 2005-277845 A | 10/2005 |
| JP | 2005-295431 A | 10/2005 |
| JP | 2006-270274 A | 10/2006 |
| JP | 2007-67639 A | 3/2007 |
| JP | 2007-67963 A | 3/2007 |
| JP | 2007-235399 A | 9/2007 |
| JP | 2014-39166 A | 2/2014 |

* cited by examiner

INFORMATION PROCESSING APPARATUS, INFORMATION PROCESSING METHOD, AND PROGRAM

TECHNICAL FIELD

The present disclosure relates to an information processing apparatus, an information processing method, and a program, and more particularly, to an information processing apparatus, an information processing method, and a program with which it is possible to achieve camerawork corresponding to changes in various conditions when controlling multiple robot cameras.

BACKGROUND ART

In the case of capturing images of a television program recording, a live music performance broadcast, a sports broadcast, and the like, it is necessary to capture images using many cameras from many viewpoints.

Typically, capturing images using a variety of cameras requires a large camera staff, and the costs associated with image capture increase.

Accordingly, reducing the number of camera staff by converting the cameras used for image capture to remotely operated robot cameras which do not require camera staff, and thereby reducing the costs associated with image capture, has been proposed.

Regarding such robot camera control technology, a technology that acquires position information about a subject, and on the basis of the position information about the subject, captures images while switching the image capture direction and operating mode of a robot camera has been proposed (see Patent Literature 1).

Also, a technology has been proposed in which images are captured while recording parameters that control the operation related to image capture in a robot camera in association with position information about a subject in a rehearsal for recording a television program, and after that, when recording a take, position information about the subject is acquired and operation by the parameters recorded during the rehearsal are corrected, thereby capturing images appropriately even if the subject makes different movements from the rehearsal when recording the take (see Patent Literature 2).

CITATION LIST

Patent Literature

Patent Literature 1: JP 2005-277845A
Patent Literature 2: JP 2003-348384A

DISCLOSURE OF INVENTION

Technical Problem

However, the camerawork achieved by the technologies according to Patent Literature 1 and 2 described above is not responsive to the flow of music during a studio recording of a musical program, a broadcast of a live music performance, and the like.

Also, when capturing images of a sports broadcast or the like, the camerawork achieved by the technologies according to Patent Literature 1 and 2 described above is not camera work responsive to, for example, changes in score, the degree of activity by the athletes, and the like following the flow of the match.

In other words, the camerawork achieved by the technologies according to Patent Literature 1 and 2 described above is able to apply changes to the camerawork on the basis of position information about a subject while continuing to capture images using a robot camera, but the camerawork is not responsive to changes in conditions other than the position information about the subject while continuing to capture images.

The present disclosure has been devised in light of such circumstances, and in particular, makes it possible to achieve camerawork corresponding to changes in various conditions when controlling multiple robot cameras.

Solution to Problem

An information processing apparatus according to an aspect of the present disclosure is an information processing apparatus including: a control section that specifies, on a basis of a table set in which timing information, position information indicating a position of a subject, and camerawork information indicating camerawork are associated, camerawork corresponding to current timing information indicating a current time of image capture and current position information indicating a current position of the subject, and controls the camerawork of an image capture apparatus that captures the subject according to the specified camerawork.

The table set can be provided in correspondence with each of a plurality of image capture apparatuses. The control section can be caused to control the camerawork of each image capture apparatus by using a table set for each of the plurality of image capture apparatuses.

The table set can be provided for each image capture target. The control section can be caused to selectively use a table set corresponding to the image capture target.

The control section can be caused to selectively use any of a plurality of table sets set with respect to a same image capture target, on a basis of condition information indicating a condition of the image capture target.

The condition information can be stats information in a case in which the image capture target is a sports broadcast, and be a musical score in a case in which the image capture target is a live music performance.

In a case in which position information corresponding to the current position information does not exist in the table set, the control section can be caused to use a plurality of position information corresponding to positions neighboring the current position information to interpolate position information corresponding to the current position information.

The position information can be information that indicates a position in a three-dimensional space.

The camerawork control information can be information that controls any of a pan, a tilt, and a zoom of the image capture apparatus.

In a case in which the subject is recognized from an image captured by the image capture apparatus, and a position of the subject indicated by the camerawork information does not match a recognized position of the subject, the control section can be caused to correct the specified camerawork on a basis of the image captured by the image captured apparatus.

An information processing method according to an aspect of the present disclosure is an information processing method including: a step of specifying, on a basis of a table set in which timing information, position information indicating a position of a subject, and camerawork information indicating camerawork are associated, camerawork corresponding to current timing information indicating a current time of image capture and current position information indicating a current position of the subject, and controlling the camerawork of an image capture apparatus that captures the subject according to the specified camerawork.

A program according to an aspect of the present disclosure is a program causing a computer to execute a process including: a control section that specifies, on a basis of a table set in which position information indicating a position of a subject, camera work information, and camerawork information indicating camerawork are associated, camerawork corresponding to current timing information indicating a current time of image capture and current position information indicating a current position of the subject, and controls the camerawork of an image capture apparatus that captures the subject according to the specified camerawork.

According to an aspect of the present disclosure, on a basis of a table set in which timing information, position information indicating a position of a subject, and camerawork information indicating camerawork are associated, camerawork corresponding to current timing information indicating a current time of image capture and current position information indicating a current position of the subject is specified, and the camerawork of an image capture apparatus that captures the subject is controlled according to the specified camerawork.

Advantageous Effects of Invention

According to one aspect of the present disclosure, it becomes possible to achieve camerawork corresponding to changes in various conditions during the image capture of multiple robot cameras.

MODE(S) FOR CARRYING OUT THE INVENTION

Figure 1:
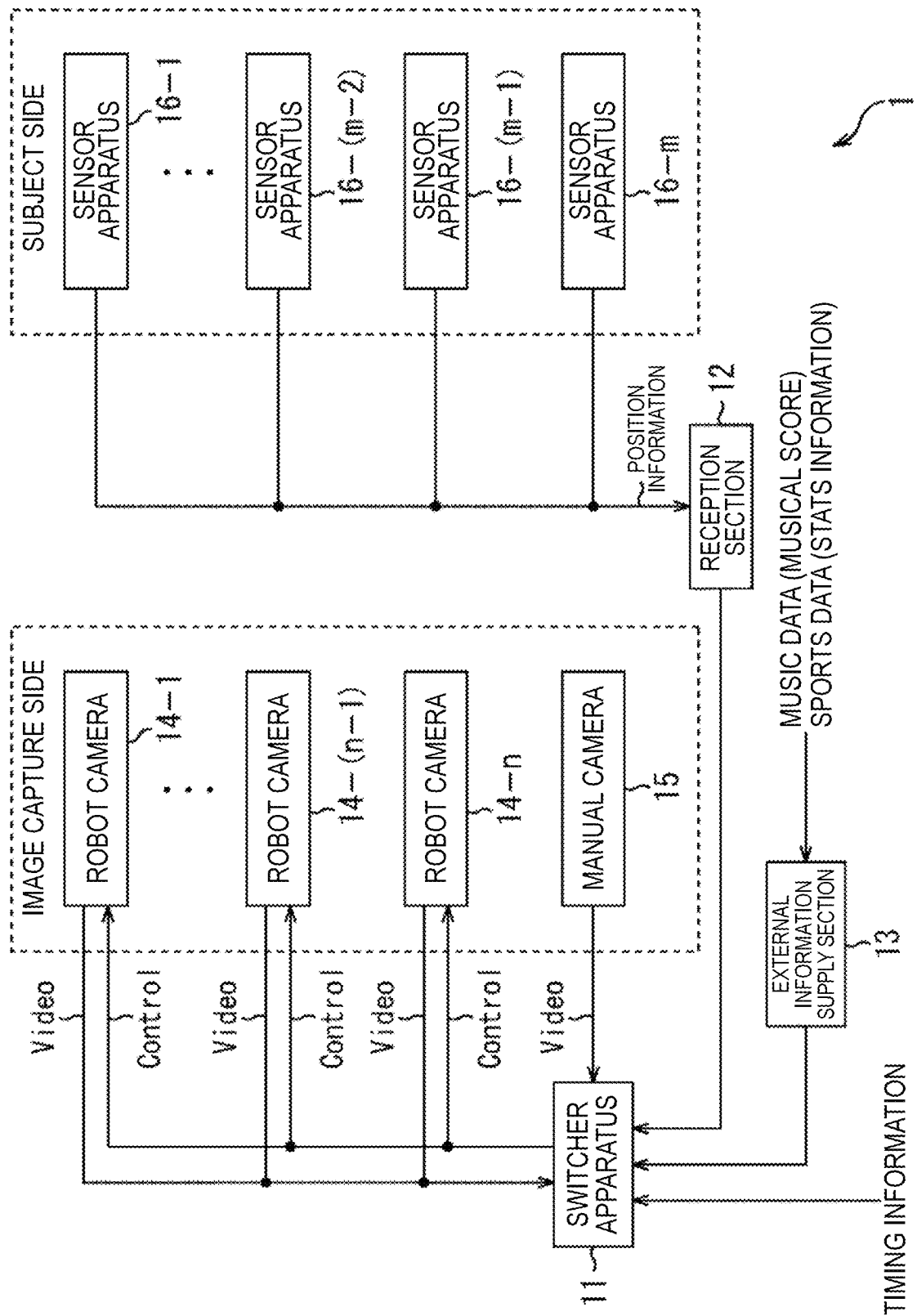
FIG. 1 is a block diagram illustrating an exemplary configuration of a robot camera control system of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, the description will proceed in the following order.
1. First embodiment
2. Second embodiment
3. Third embodiment 1. First Embodiment <Exemplary Configuration of Robot Camera Control System>

FIG. 1 will be referenced to describe a robot camera control system applying the technology of the present disclosure. The robot camera control system of FIG. 1 is a system used to record a television program, a live music performance, a sports broadcast, and the like using multiple robot cameras, in which the image capture of a performer, artist, or sports athlete treated as a subject by the remotely operated robot cameras is controlled in accordance with the flow of the television program, the live music performance, or the sports broadcast.

Note that in the following, the description will proceed by taking the example of the case of capturing images of a television program recording, a live music performance, and a sports broadcast as the use of the robot camera control system, but this use is merely one example, and obviously an image capture target other than for recording a television program, a live music performance, and a sports broadcast may also be captured.

More specifically, a robot camera control system 1 includes a switcher apparatus 11, a reception section 12, an external information supply section 13, robot camera 14-1 to 14-*n*, a manual camera 15, and sensor apparatus 16-1 to 16-*m*. Note that in the following, the robot cameras 14-1 to 14-*n* and the sensor apparatus 16-1 to 16-*m* will be simply designated the robot camera 14 and the sensor apparatus 16 in cases where it is not necessary to individually distinguish them, and the rest of the configuration will be referred to similarly.

Being organized inside the dashed frame on the subject side of the drawing, the sensor apparatus 16-1 to 16-m are carried by performers, artists, sports athletes, or the like who are treated as the subjects, and acquire and transmit position information to the reception section 12 by a wireless communication function.

Note that the sensor apparatus 16 may be carried by a variety of objects not limited to people, insofar as the carrier is treated as a subject, and particularly, is a moving object. For example, in a broadcast of a basketball game or the like, the sensor apparatus 16 may be carried by the basketball or the like to enable position information about the basketball to be acquired. Also, in this example, transmitting position information to the reception section 12 by a wireless communication function is illustrated as an example, but in cases in which the motion of the target (subject) carrying the sensor apparatus 16 is limited (in the case in which, for example, the subject is a doll or the like that moves in a fixed range on a stage set or the like), the position information may also be transmitted to the reception section 12 by a wired communication function.

The reception section 12 receives each piece of position information transmitted by the sensor apparatus 16-1 to 16-m, and transmits to the switcher apparatus 11 by a wired or wireless communication function.

Being organized inside the dashed frame on the image capture side of the drawing, with the camerawork is controlled by the switcher apparatus 11, the robot cameras 14-1 to 14-n capture the performers, artists, or sports athletes treated as the subjects, for example, and transmit captured images to the switcher apparatus 11.

The manual camera 15 is a camera that captures an image while being operated by camera staff, capturing a subject with camerawork according to operations of the camera staff, and transmitting the captured image to the switcher apparatus 11.

The external information supply section 13 acquires external information containing program progress information in the case of a television program, musical score information in the case of a live music performance, or sports data including the score, athlete activity data, and the like, also known as stats information in the case of a sports broadcast, from a server for information delivery or the like (not illustrated) over a network, and supplies the external information to the switcher apparatus 11.

The switcher apparatus 11 receives the images captured by the robot cameras 14-1 to 14-n which act as input systems, and outputs by switching to one or more output systems not illustrated. The switcher apparatus 11 controls the operation of the camerawork of the robot cameras 14-1 to 14-n on the basis of each piece of position information of the sensor apparatus 16-1 to 16-m supplied by the reception section 12, the external information supplied by the external information acquisition section 13, and timing information indicating the elapsed time of image capture, thereby causing the subjects to be captured, and receiving the captured images from the robot cameras 14-1 to 14-n. Note that the timing information may be absolute time information, or some other parameter indicating the time elapsed.

<Exemplary Configuration of Switcher Apparatus in FIG. 1>

Figure 2:
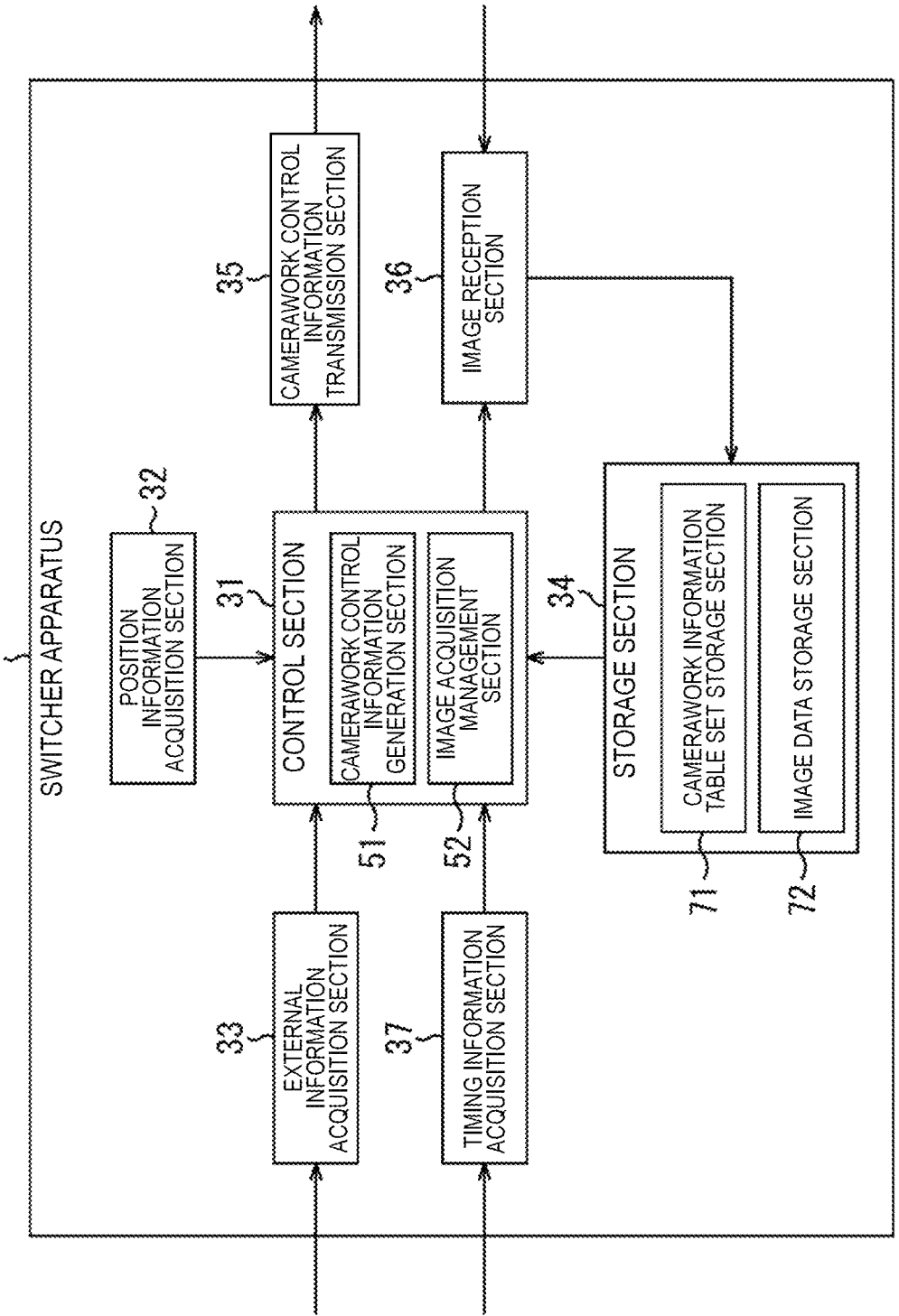
FIG. 2 is a diagram illustrating an exemplary configuration of a first embodiment of a switcher apparatus.

Next, the block diagram in FIG. 2 will be referenced to describe an exemplary configuration of the switcher apparatus 11.

The switcher apparatus 11 includes a control section 31, a position information acquisition section 32, an external information acquisition section 33, a storage section 34, a camerawork control information transmission section 35, an image reception section 36, and a timing information acquisition section 37.

The control section 31 controls the overall operation of the switcher apparatus 11, and is provided with a camerawork control information generation section 51 and an image acquisition management section 52.

The camerawork control information generation section 51 acquires timing information by the timing information acquisition section 37 and each piece of position information of the sensor apparatus 16-1 to 16-m by the position information acquisition section 32. Also, the camerawork control information generation section 51 reads out a camerawork information table set corresponding to the image capture target to capture from among camerawork information table sets stored for each image capture target stored in a camerawork information table set storage section 71 of the storage section 34.

Herein, a camerawork information table set is a table for specifying camerawork information corresponding to the position of a subject and timing information expressing the elapsed time of image capture. Camerawork information refers to information specifying pan/tilt/zoom values for controlling the robot camera 14 to capture a specific subject by specific camerawork at each timing designated by the timing information.

Among the camerawork information table set read out according to the image capture target to capture, from information about pan, tilt, and zoom of the camerawork information corresponding to the timing information, the camerawork control information generation section 51 generates camerawork control information (Control) in a format recognizable by each of the robot cameras 14-1 to 14-n.

Additionally, the camerawork control information generation section 51 causes the generated camerawork control information to be transmitted to each of the robot cameras 14-1 to 16-n by the camerawork control information transmission section 35.

The image acquisition management section 52 controls the image reception section 36 to store images (Video) captured by the robot cameras 14-1 to 14-n in an image data storage section 72 of the storage section 34 successively in association with identifiers that identify the robot cameras 14-1 to 14-n.

The position information acquisition section 32 acquires position information about each of the sensor apparatus 16-1 to 16-m transmitted by the reception section 12, and supplies the position information to the control section 31.

The external information acquisition section 33 acquires external information supplied by the external information supply section 13, and supplies the external information to the control section 31.

The storage section 34 is provided with the camerawork information table set storage section 71 and the image data storage section 72. The camerawork information table sets stored in the camerawork information table set storage section 71 will be described later with reference to FIG. 6. Also, the image data storage section 72 stores images captured by each of the robot cameras 14-1 to 14-n, in association with respectively corresponding identifiers.

Herein, the description will proceed on the premise that the images captured by each of the robot cameras 14-1 to 14-n and stored in the image data storage section 72 are moving images including audio, but obviously the images may also be still images, or moving images only.

The timing information acquisition section 37 acquires timing information supplied externally, and supplies the timing information to the control section 31.

<Exemplary Configuration of Robot Camera>

Figure 3:
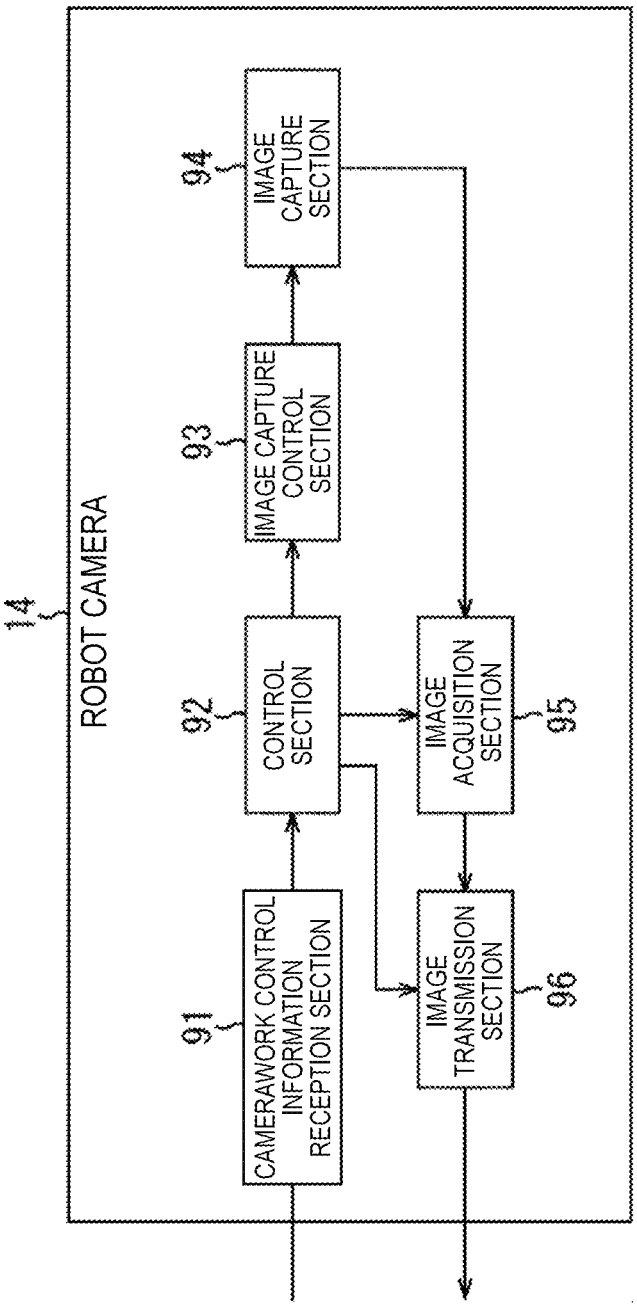
FIG. 3 is a diagram illustrating an exemplary configuration of a robot camera.

Next, the block diagram in FIG. 3 will be referenced to describe an exemplary configuration of the robot camera 14.

On the basis of camerawork control information from the switcher apparatus 11, the robot camera 14 adjusts the angle of view, and outputs an image captured with the composition based on the adjusted angle of view to the switcher apparatus 11. Consequently, the robot camera 14 is able to adjust the angle of view unattended, without requiring camera staff.

More specifically, the robot camera 14 is provided with a camerawork control information reception section 91, a control section 92, an image capture control section 93, an image capture section 94, an image acquisition section 95, and an image transmission section 96.

The camerawork control information reception section 91 receives camerawork control information transmitted from the switcher apparatus 11, and supplies the camerawork control information to the control section 92.

The control section 92 controls the overall operation of the robot camera 14, and in addition, generates a control signal that controls the image capture control section 93 on the basis of camerawork control information supplied by the camerawork control information reception section 91, and controls the image capture control section 93.

The image capture control section 93 controls the pan, tilt, and zoom of the image capture section 94 on the basis of the control signal from the control section 92.

The image capture section 94 includes an image sensor and an optical block. The image capture section 94 is provided with pan, tilt, and zoom mechanisms, and under control by the image capture control section 93, captures and outputs an image to the image acquisition section 95. The zoom mechanism referred to herein may be a combination of a mechanism realized by an optical zoom utilizing the optical block and a mechanism realized by an electronic zoom, or may be realized by only one of these mechanisms.

The image acquisition section 95, under control by the control section 92, acquires and temporarily stores an image supplied by the image capture section 94, and when the image is to be transmitted in the image transmission section 96 downstream, the image acquisition section 95 makes adjustments such that underflow and overflow do not occur, and outputs the image to the image transmission section 96.

The image transmission section 96 is controlled by the control section 92, and transmits image data supplied by the image acquisition section 95 to the switcher apparatus 11.

<Exemplary Configuration of Manual Camera>

Figure 4:
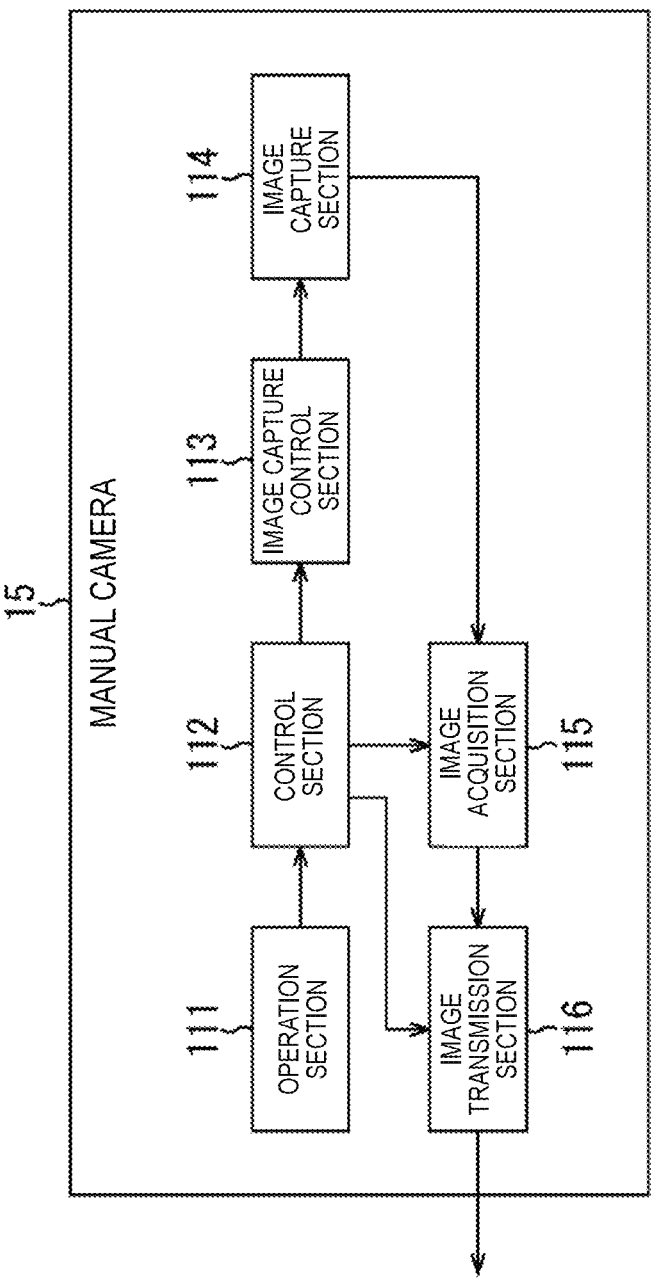
FIG. 4 is a diagram illustrating an exemplary configuration of a manual camera.

Next, the block diagram in FIG. 4 will be referenced to describe an exemplary configuration of the manual camera 15.

The manual camera 15 captures an image according to operations of the camera staff, and transmits the captured image to the switcher apparatus 11.

More specifically, the manual camera 15 is provided with an operation section 111, a control section 112, an image capture control section 113, an image capture section 114, an image acquisition section 115, and an image transmission section 116.

The operation section 111 receives operations by the camera staff for controlling the pan, tilt, and zoom of the image capture section 114, and outputs an operation signal corresponding to the operation content to the control section 112.

The control section 112 controls the overall operation of the manual camera 15, and in addition, generates and supplies a control signal that controls the image capture control section 93 on the basis of the operation signal supplied by the operation section 111. Note that, besides having the control section 112 control actuators or the like that adjust the attitude of the image capture section 114, it is also possible to achieve the pan, tilt, and zoom in the manual camera 15 by having the camera staff achieve panning and tilting by directly swinging the image capture section 114 mounted on a pan and tilt head, and achieve zooming by a manual operation.

Note that since the image capture control section 113, the image capture section 114, the image acquisition section 115, and the image transmission section 116 have the same configuration as the image capture control section 93, the image capture section 94, the image acquisition section 95, and the image transmission section 96, respectively, a description is omitted.

<Exemplary Configuration of Sensor Apparatus>

Figure 5:
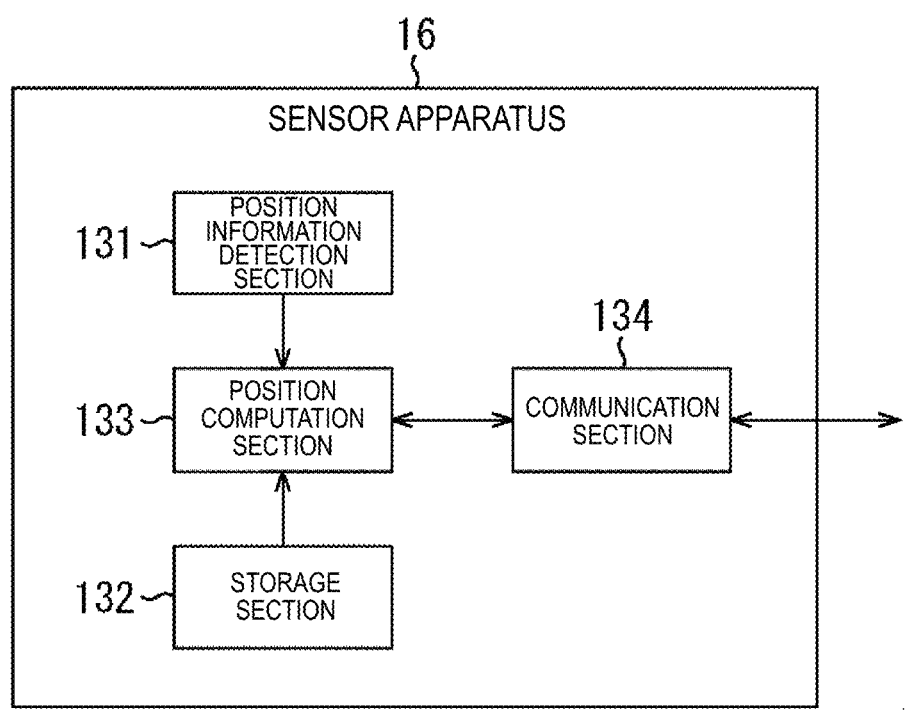
FIG. 5 is a diagram illustrating an exemplary configuration of a sensor apparatus.

Next, the block diagram in FIG. 5 will be referenced to describe an exemplary configuration of the sensor apparatus 16.

The sensor apparatus 16 is provided with a position information detection section 131, a storage section 132, a position computation section 133, and a communication section 134.

The position information detection section 131 is a position detecting apparatus using a global navigation satellite system (GNSS), for example, detecting information about a position on Earth on the basis of signals from satellites (not illustrated), and outputting the position information to the position computation section 133.

The storage section 132 stores calibration information for correcting error unique to each position information detection section 131, and outputs the calibration information to the position computation section 133.

The position computation section 133 corrects the position information supplied by the position information detection section 131 on the basis of the calibration information to compute and supply appropriate position information to the communication section 134. Note that the position information detected by the position information detection section 131 may also be supplied to the communication section 134 directly, without providing the position computation section 133.

The communication section 134 acquires the position information supplied by the position computation section 133, and transmits the position information to the reception section 12.

<Camerawork Information Table Set>

Figure 6:
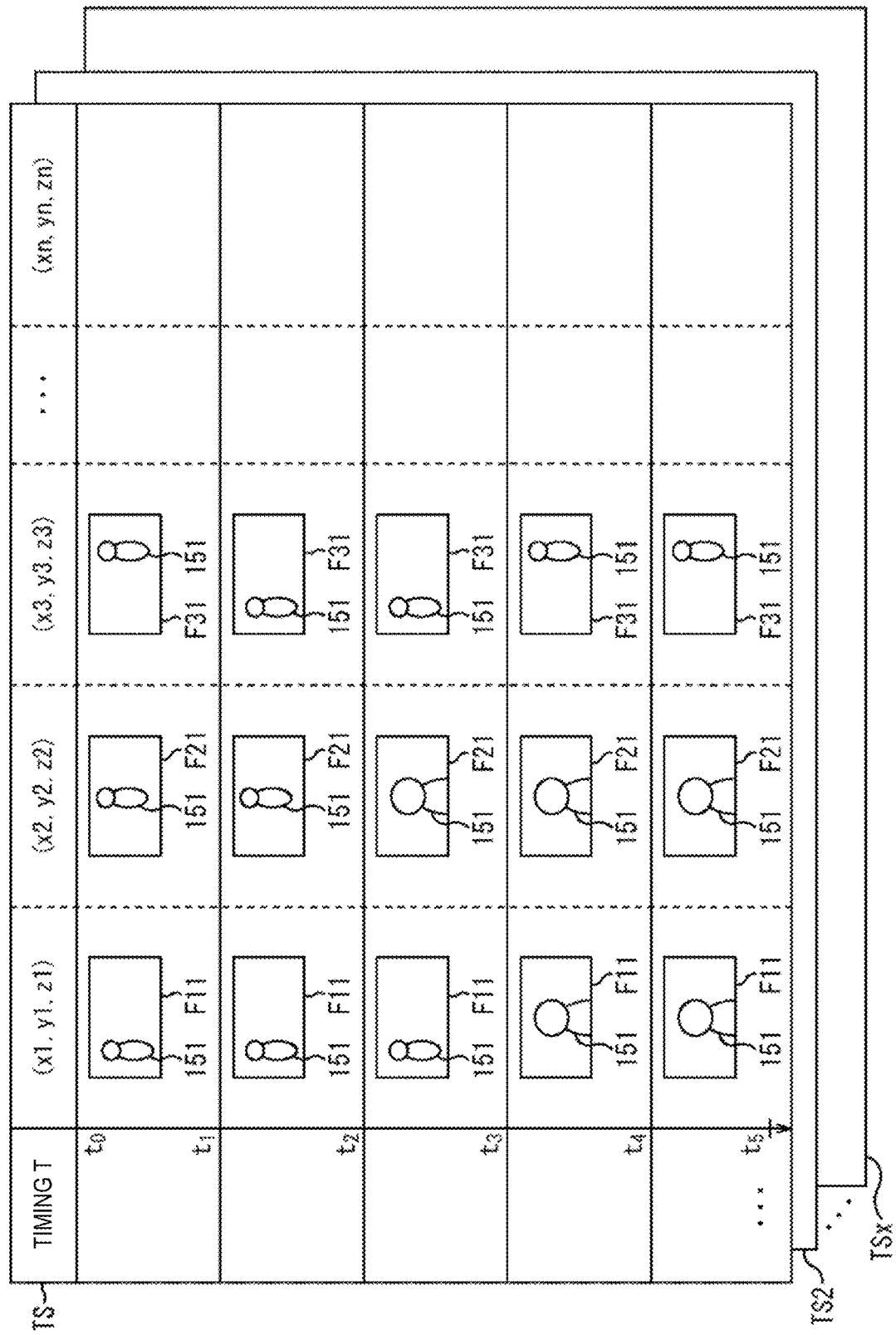
FIG. 6 is a diagram explaining a camerawork information table set.

Next, FIG. 6 will be referenced to describe a camerawork information table set.

A camerawork information table set is a set for each robot camera 14, and as illustrated in FIG. 6, for example, is a table set of camerawork information set for each coordinate position in the three-dimensional space in which the subject exists. In FIG. 6, camerawork table sets TS1 to TSx are included for each image capture target to capture.

Note that the camerawork information table sets TS1 to TSn may also be set for each robot camera 14, respectively. Also, the camerawork information table sets TS1 to TSn are set in correspondence with each image capture target to capture, such as a television program recording, a live music performance, and a sports broadcast, for example. Note that the table sets TS1 to TSx will be simply designated the table set TS in cases where it is not necessary to individually distinguish them.

Each table set TS includes, for each robot camera 14, camerawork information set for each position inside the three-dimensional space of the subject. Note that the camerawork information may also be set for each position inside a two-dimensional space, like expressing the positions of athletes present inside a tennis court expressed in two dimensions, for example.

The camerawork information is information specifying, for each robot camera 14, which subject is to be captured by what kind of camerawork at each timing designated by the timing information.

More specifically, the camerawork information is information specifying the position of the subject, and also the magnitude and direction of the zoom, pan, and tilt as well as changes in magnitude of the above at each timing.

For example, the table set TS1 in FIG. 6 is an example of a table set TS used in the image capture of a live music performance. The table set TS1 is a table in which camerawork information about when the subject exists at each position of the coordinates (x1, y1, z1), (x2, y2, z2), (x3, y3, z3), . . . , (xn, yn, zn) inside the three-dimensional space at each timing T corresponding to time elapsing in the downward direction of the diagram is registered.

In other words, in the table set TS1 of FIG. 6, for example, in the case in which the position information of a subject 151 is the coordinates (x1, y1, z1), at the timings T=t0 to t3, there is registered camerawork information specifying image capture with a composition (camerawork) whereby the full body of the subject in the vertical direction is contained inside an image F11 in which the subject 151 is captured, and in addition, the subject is positioned at a position on the left in the horizontal direction.

Also, in the case in which the position information of the subject 151 is the coordinates (x1, y1, z1), at the timings T=t3 to t5, there is registered camerawork information specifying image capture with a composition (camerawork) whereby the upper body of the subject in the vertical direction is contained inside the image F11 in which the subject 151 is captured, and in addition, the subject is positioned at a center position in the horizontal direction.

Furthermore, in the case in which the position information of the subject 151 is the coordinates (x2, y2, z2), at the timings T=t0 to t2, there is registered camerawork information specifying image capture with a composition (camerawork) whereby the full body of the subject in the vertical direction is contained inside an image F21 in which the subject 151 is captured, and in addition, the subject is positioned at a center position in the horizontal direction.

Also, in the case in which the position information of the subject 151 exists at the coordinates (x2, y2, z2), at the timings T=t2 to t5, there is registered camerawork information specifying image capture with a composition (camerawork) whereby the upper body of the subject in the vertical direction is contained inside the image F21 in which the subject 151 is captured, and in addition, the subject is positioned at a center position in the horizontal direction.

Similarly, in the case in which the position information of the subject 151 exists at the coordinates (x3, y3, z3), at the timings T=t0 to t1, there is registered camerawork information specifying image capture with a composition (camerawork) whereby the full body of the subject in the vertical direction is contained inside an image F31 in which the subject 151 is captured, and in addition, the subject is positioned at a position on the right in the horizontal direction.

Also, in the case in which the position information of the subject 151 exists at the coordinates (x3, y3, z3), at the timings T=t1 to t3, there is registered camerawork information specifying image capture with a composition (camerawork) whereby the full body of the subject in the vertical direction is contained inside the image F31 in which the subject 151 is captured, and in addition, the subject is positioned at a position on the left in the horizontal direction.

Furthermore, in the case in which the position information of the subject 151 exists at the coordinates (x3, y3, z3), at the timings T=t3 to t5, there is registered camerawork information specifying image capture with a composition (camerawork) whereby the full body of the subject in the vertical direction is contained inside the image F31 in which the subject 151 is captured, and in addition, the subject is positioned at a position on the right in the horizontal direction.

Note that each piece of camerawork information stored in the table in FIG. 6 is denoted as the composition of the subject captured by each robot camera 14, but the actual camerawork information is information specifying the pan/tilt/zoom for achieving the camerawork required during image capture by the robot camera 14.

The position of the subject 151 can be specified by the position information transmitted by the sensor apparatus 16 carried by the subject 151. Accordingly, for example, in the case in which the position information of the subject 151 exists at the coordinates (x1, y1, z1), at the timings T=t0 to t3, the robot camera control information generation section 51 generates, on the basis of the position information of the subject 151 and the camerawork information, robot camera control information from the camerawork information table set TS indicating camerawork information including pan/tilt/zoom information for controlling a robot camera 14 capable of achieving the composition (camerawork) whereby the full body of the subject 151 in the vertical direction is contained inside the image F11, and in addition, the subject 151 is positioned to the left of center in the horizontal direction, and causes the generated robot camera control information to be transmitted to the robot camera 14 from the camerawork control information transmission section 35.

Also, for example, in the case of capturing a live music performance, the camerawork information is information designating the specification of a composition (angle of view) of the subject according to the position of the subject 151 on a stage 171 where the live music performance is held at predetermined timings.

Figure 7:
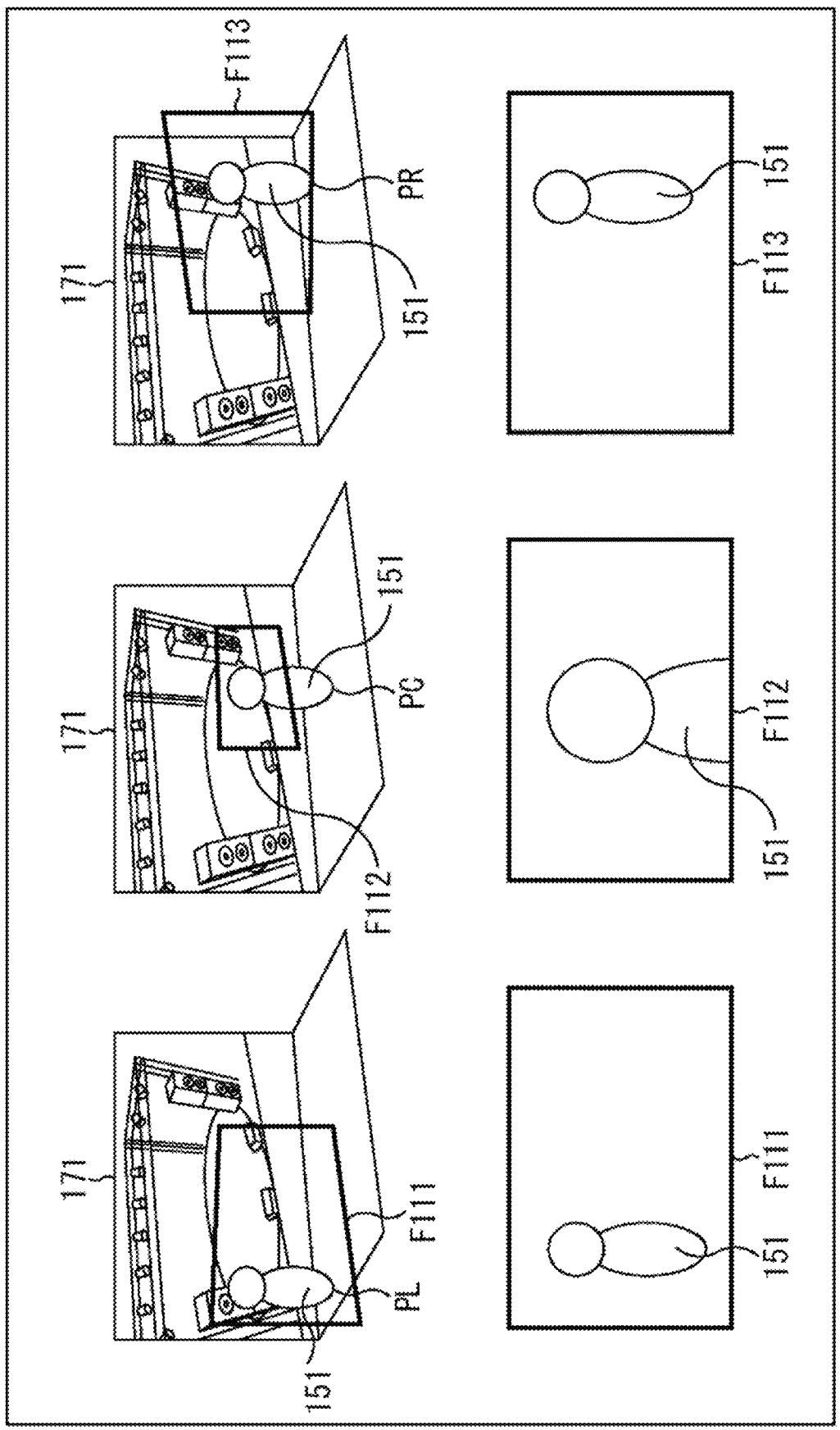
FIG. 7 is a diagram explaining camerawork information.

In other words, as illustrated by the left part of FIG. 7, at a predetermined timing T, on the stage 171 at a live music performance, for example, in the case in which an artist acting as the subject 151 exists at a position PL on the left side facing the stage 171, the camerawork information is information designating control of the composition such that the full body of the subject in the vertical direction is contained inside an image F111 captured by the robot camera 14, and in addition, control of the composition such that the subject is positioned on the left of the image F111.

Also, as illustrated by the center part of FIG. 7, at a predetermined timing T, for example, in the case in which the artist acting as the subject 151 exists at a position PC in the front and center of the stage 171, as illustrated by an image F112 captured by the robot camera 14, the camerawork information is information designating control of the composition such that the upper body of the subject in the vertical direction is contained inside the image F112, and in addition, control of the composition such that the subject is positioned in the center in the horizontal direction of the image F112.

Similarly, as illustrated by the right part of FIG. 7, at a predetermined timing T, for example, in the case in which the artist acting as the subject 151 exists at a position PR on the right side facing the stage 171, as illustrated by a captured image F113, the camerawork information is information designating control of the composition such that the upper body of the subject in the vertical direction is contained inside the image F113, and in addition, control of the composition such that the subject is positioned to the right in the horizontal direction of the image F113.

By giving instructions in this way, various camerawork depending on the position of the subject can be achieved.

Note that in FIG. 7, in each of the upper parts, each of the positions PL, PC, and PR of the subject 151 on the stage 171 and the corresponding ranges of the image F111 to F113 captured by the robot camera 14 are illustrated, while in the lower parts, the images F111 to F113 are illustrated.

<Relationship Between Pixel Position in Two-Dimensional Space in Captured Image and Position in Three-Dimensional Space of Subject>

Figure 8:
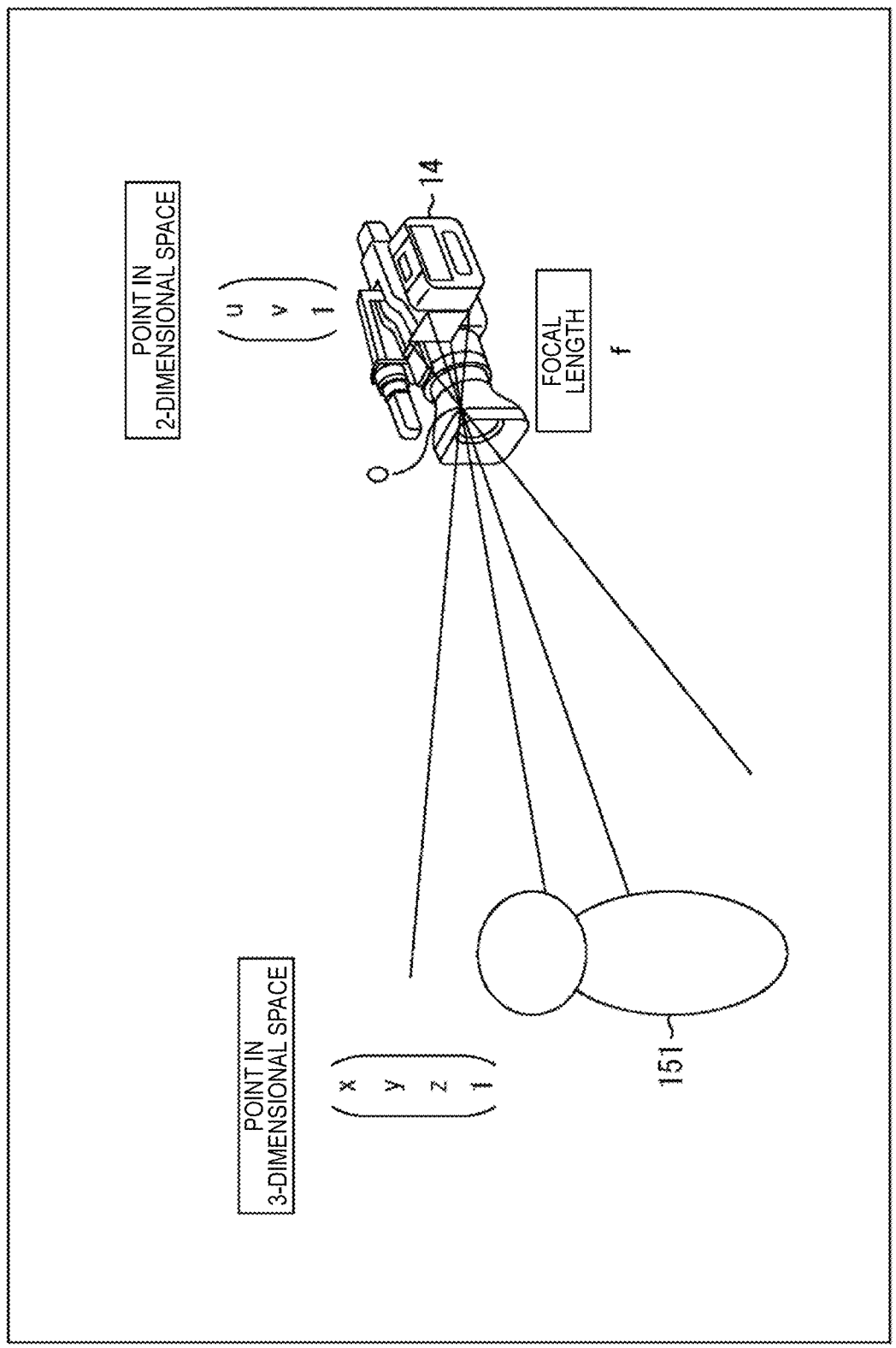
FIG. 8 is a diagram explaining the relationship between the position of a subject in a three-dimensional space and a pixel position in a two-dimensional space inside an image captured by a robot camera.
Figure 9:
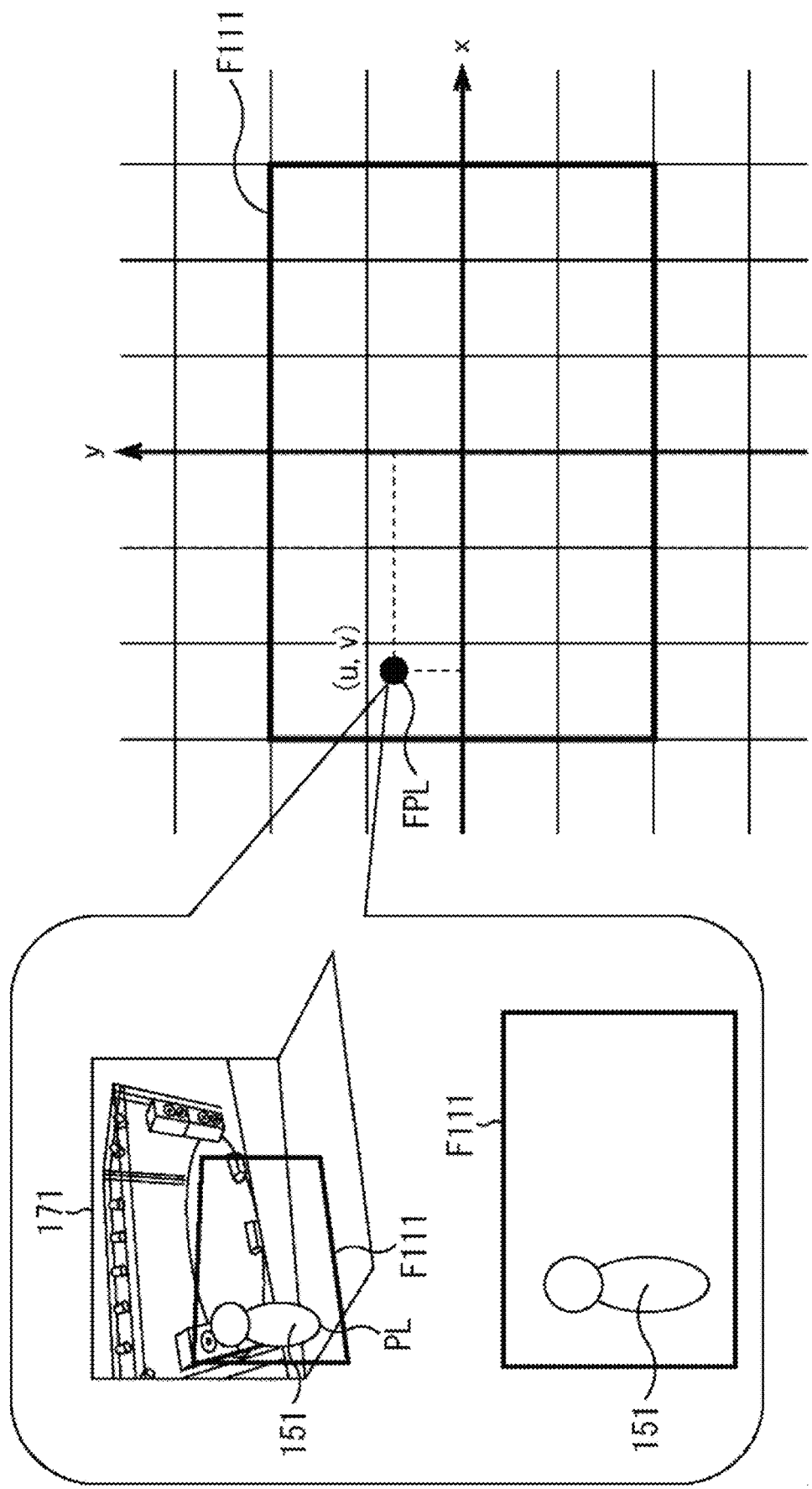
FIG. 9 is a diagram explaining the relationship between the position of a subject in a three-dimensional space and a pixel position in a two-dimensional space inside an image captured by a robot camera.

Next, FIGS. 8 and 9 will be referenced to describe the relationship between the pixel position in the two-dimensional space in a captured image and the position in the three-dimensional space of the subject.

As illustrated in FIG. 8, when the coordinate position of a point inside the three-dimensional space of the subject 151 captured by the robot camera 14 is denoted by the transposed matrix of the coordinates (x, y, z, 1), and the coordinate position of a corresponding point inside an image captured by the robot camera 14 is denoted by the transposed matrix of the coordinates (u, v, 1), a camera model based on a perspective projection model is expressed by Formula (1) including the following matrix formula.

[Math. 1]

$$\lambda \begin{pmatrix} u \\ v \\ 1 \end{pmatrix} = \begin{pmatrix} f_u & s & u_0 \\ 0 & f_v & v_0 \\ 0 & 0 & 1 \end{pmatrix} \begin{pmatrix} r_{00} & r_{01} & t_{02} & t_0 \\ r_{10} & r_{11} & t_{12} & t_1 \\ r_{20} & r_{21} & t_{22} & t_2 \end{pmatrix} \begin{pmatrix} x \\ y \\ z \\ 1 \end{pmatrix} \quad (1)$$

Herein, fu and fv are parameters expressing the focal length of the robot camera 14, u and v are parameters expressing a center position (the position where the sensor apparatus 16 is carried) of the subject 151 inside the captured image, s is a parameter expressing the skew, and $r_{ij}$ (where i, j=0, 1, 2) and $t_i$ (where i=0, 1, 2) are parameters expressing rotation and translation, respectively.

In other words, the point existing at the coordinates (x, y, z, 1) inside the three-dimensional space is projected onto the coordinates (u, v, 1) inside the two-dimensional image space.

Herein, regarding the pan, tilt, and zoom, the pan P/tilt T are expressed by $r_{ij}$, while the zoom factor Z is expressed by fu, fv.

Accordingly, by defining the pan P/tilt T to be $r_{ij}$=R(x, y, z), defining the zoom factor Z=(fu+fv)/2 to be F(x, y, z), and specifying the pan P/tilt T=R(x, y, z) and the zoom factor Z=F(x, y, z) in advance, the camerawork of the robot camera 14 is specified.

For example, as illustrated by the right part of FIG. 9, when pixel position coordinates (x, y) are defined with the center position of the image F111 captured by the robot camera 14 as the coordinate center, in the case in which the subject 151 at the position PL on the stage 171 illustrated by the upper left part of FIG. 9 is expressed as the point at the coordinates (x, y, z, 1), by using Formula (1) described above, the corresponding subject 151 is projected as a point at the pixel position FPL(u, v, 1) inside the image F111.

By using such a relationship to associate the coordinate position (position information) of the subject 151 inside the three-dimensional space with the pixel position inside the image captured by the robot camera 14 based on the camerawork information, the camerawork control information generation section 51 becomes able to compute camerawork control information controlling the pan, tilt, and zoom of the robot camera 14, and is able to set a variety of camerawork.

The camerawork information is information specifying a subject to capture in each robot camera 14, and the composition related to the subject. Specifically, the camerawork information is information about the pan/tilt/zoom for capturing the subject with the composition related to the subject. The camerawork control information is information obtained by converting the information about the pan/tilt/zoom specified by the camerawork information into information recognizable by the robot camera 14. Consequently, in the case in which the robot camera 14 is able to recognize the camerawork information, conversion to the camerawork control information is not necessary.

Also, the camerawork information is set for each piece of coordinate information inside the three-dimensional space where the subject 151 may exist, but the camerawork information may also be set for each region having a certain range.

Also, table sets do not have to be prepared for all positions of the subject. In this case, the camerawork information may be generated by interpolation from camerawork information corresponding to multiple pieces of position information close to the position of the subject.

<Camerawork Control Process>

Figure 10:
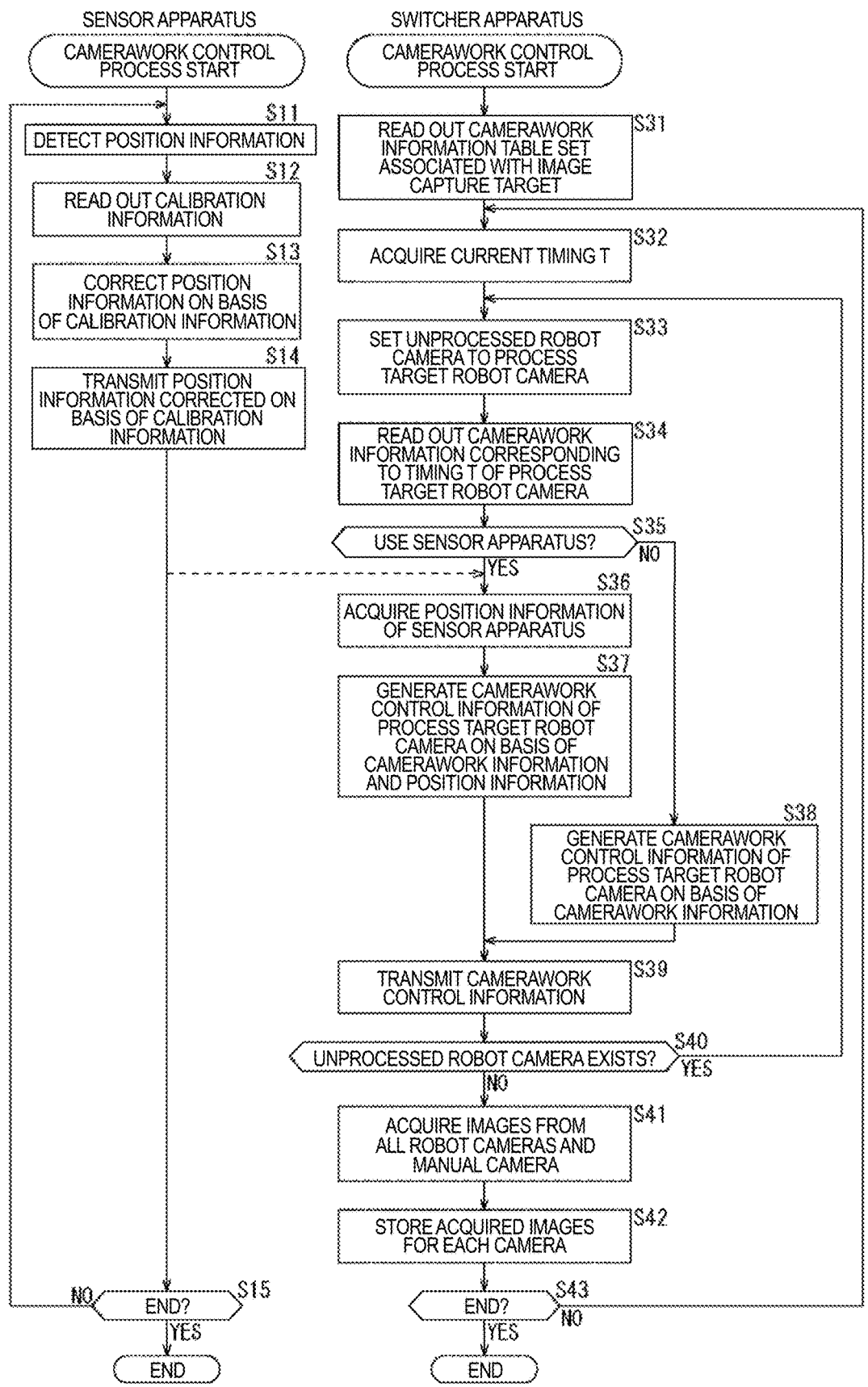
FIG. 10 is a flowchart explaining a camerawork control process of the first embodiment.
Figure 11:
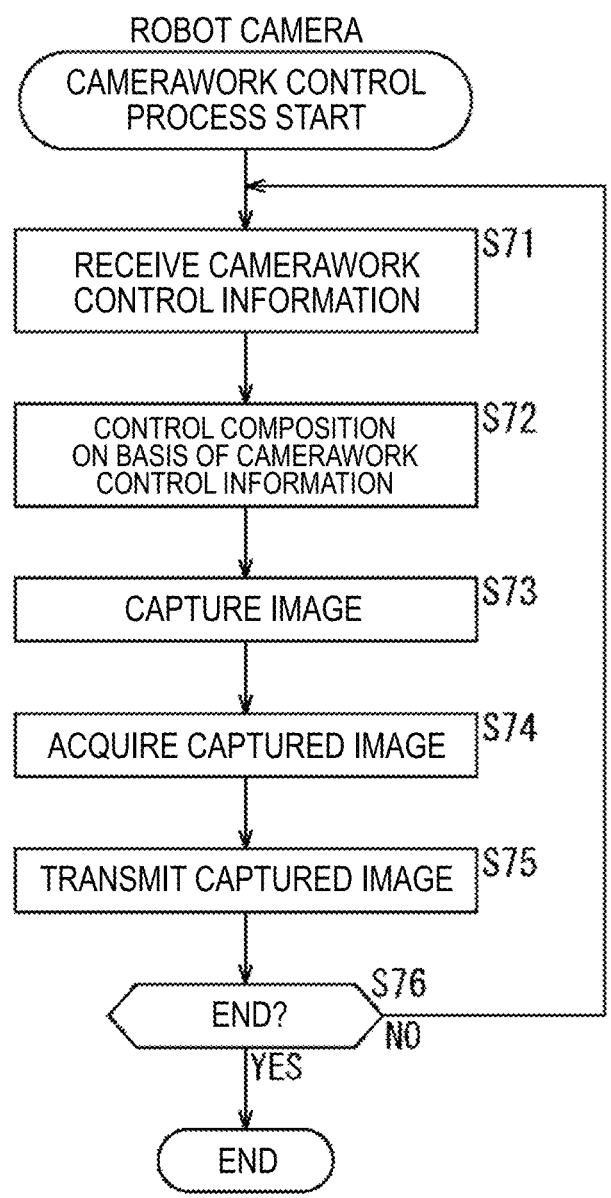
FIG. 11 is a flowchart explaining a camerawork control process of the first embodiment.

Next, the flowcharts in FIGS. 10 and 11 will be referenced to describe a camerawork control process by the robot camera control system 1 of FIG. 1.

In step S11, the position information detection section 131 of the sensor apparatus 16 receives a single from GNSS satellites (not illustrated), detects current position information, and supplies the current position information to the position computation section 133.

In step S12, the position computation section 133 reads out the calibration information stored in the storage section 132.

In step S13, the position computation section 133 corrects the position information supplied by the position information detection section 131 on the basis of the calibration information, and outputs the corrected position information to the communication section 134.

In step S14, the communication section 134 transmits the corrected position information to the reception section 12.

The position information transmitted by the communication section 134 is information including an identifier (id) that identifies the sensor apparatus 16, type information (type) about the carrier carrying the sensor apparatus 16, and coordinate information (x, y, z) indicating the position. The type information (type) about the carrier carrying the sensor apparatus 16 is, for example, "Player in Team A" or "Player in Team B" in the case in which the image capture target to capture is a sports broadcast, or, for example, "Vocal", "Guitar", "Base", "Dancer", or the like in the case of a live music performance or concert. Consequently, the position information can be expressed like position information Sid=(id, type, x, y, z).

In step S15, the position computation section 133 determines whether or not an instruction to end the process has been issued, and in the case in which an instruction to end has not been issued, the process returns to step S11. Also, in step S15, in the case in which an instruction to end the process has been issued, the process ends. In other words, the sensor apparatus 16 repeatedly generates and transmits position information to the reception section 12 until instructed to end the process.

By the above process, the sensor apparatus 16-1 to 16-n repeat the process of individually generating and transmitting position information Sid to the reception section 12 until instructed to end the process. Subsequently, the reception section 12 receives the position information transmitted by the sensor apparatus 16-1 to 16-n, and outputs to the switcher apparatus 11.

On the other hand, in the switcher apparatus 11, in step S31, the control section 31 controls the camerawork control information generation section 51 to read out the camerawork information table set TS corresponding to the image capture target to capture from among the camerawork information table sets TS stored in the camerawork information table set storage section 71 of the storage section 34. Note that the camerawork information table set TS may also configured to be read out in advance at a timing prior to starting the camerawork control process.

In step S32, the control section 31 controls the timing information acquisition section 37 to acquire timing information T generated by an external timing generation apparatus (not illustrated).

In step S33, the control section 31 controls the camerawork control information generation section 51 to set one of the unprocessed robot cameras 14 as the process target robot camera 14.

In step S34, the camerawork control information generation section 51 reads out camerawork information corresponding to the timing information T from the camerawork information table of the process target robot camera 14 from among the read-out camerawork information table set.

In step S35, the camerawork control information generation section 51 determines whether or not to use the position information from the sensor apparatus 16. In other words, regarding the position information from the sensor apparatus 16, it is possible to switch according to a setting of whether or not to use the position information in advance, or whether or not position information is acquirable. In step S34, in the case of determining to use the position information, the process proceeds to step S36.

In step S36, the camerawork control information generation section 51 controls the position information acquisition section 32 to acquire position information from the sensor apparatus 16.

In step S37, the camerawork control information generation section 51 generates camerawork control information on the basis of the camerawork information and the position information, and the process proceeds to step S39. More specifically, the camerawork control information generation section 51 computes coordinate information Ctrln inside the three-dimensional space computed according to Formula (2) below, reads out the pan, tilt, and zoom of the corresponding robot camera 14 from the camerawork information table set, generates camerawork control information, and outputs to the camerawork control information transmission section 35.

[Math. 2]

$$ctrln = \lambda \times \frac{\Sigma(wid \times Sid)}{m} + (1 - \lambda) \times Qn \qquad (2)$$

Herein, wid is the weight of the subject acting as the carrier or carrying object that carries the sensor apparatus 16, and Sid is the position information of the sensor apparatus 16. Also, $\lambda$ is a weight with respect to the position inside the three-dimensional space of the subject specified by the sensor apparatus 16, $(1-\lambda)$ is a weight with respect to the position inside the three-dimensional space of the subject specified by the camerawork information, and Qn is the position specified by the camerawork information where the subject is assumed to exist inside the three-dimensional space when the sensor apparatus 16 is not used or in a state in which position information cannot be detected. Also, m is the number of sensor apparatus 16, and id is an identifier identifying the sensor apparatus 16.

The first term in Formula (2) becomes the value of the center-of-gravity position of the position information according to each weight of the sensor apparatus 16-1 to 16-m, multiplied by the weight $\lambda$, while the second term becomes the value of the position inside the three-dimensional space according to the camerawork information where the subject is assumed to exist in a state in which the position information is not used or the position information is not detected, multiplied by the weight $(1-\lambda)$.

Herein, the position Qn inside the three-dimensional space is position information inside the three-dimensional space where the subject 151 is assumed to exist in a state in which the sensor apparatus 16 is not used or the position information cannot be detected.

Consequently, in Formula (2), Ctrln becomes the center-of-gravity position using the weight between the position of the subject captured by the robot camera 14 inside the three-dimensional space specified by multiple sensor apparatus 16, and the position inside the three-dimensional space where the subject 151 is assumed to exist in a state in which the sensor apparatus 16 is not used or the position information cannot be detected. Adaptive control to the extent the weight $\lambda$ is large becomes possible.

On the other hand, in step S35, in the case of determining not to use the position information, the process proceeds to step S38.

In step S38, the camerawork control information generation section 51 generates camerawork control information on the basis of the camerawork information, and the process proceeds to step S39. More specifically, the camerawork control information generation section 51 generates camerawork control information according to the computation illustrated in the following Formula (3), and outputs to the camerawork control information transmission section 35.

[Math. 3]

$$ctrln = Qn \qquad (3)$$

In other words, in the case of not using the position information, robot camera control information based on the position Qn inside the three-dimensional space where the subject is assumed to exist is generated.

In step S39, the camerawork control information transmission section 35 transmits the camerawork control information to the process target robot camera 14.

In step S40, the camerawork control information generation section 51 determines whether or not an unprocessed robot camera 14 exists, and in the case in which an unprocessed robot camera 14 exists, the process returns to step S33. In other words, the process from step S33 to S40 repeats until no unprocessed robot camera 14 exists.

Subsequently, in step S40, in the case in which no unprocessed robot camera 14 is considered to exist, the process proceeds to step S41.

In response to this process, in step S71 (FIG. 11), the robot camera 14 controls the camerawork control information reception section 91 to receive and acquire camerawork control information.

In step S72, on the basis of the acquired camerawork control information, the control section 92 controls the image capture control section 93 to control the composition by the pan/tilt/zoom of the image capture section 94.

In step S73, on the basis of the acquired camerawork control information, the control section 92 controls the image capture control section 93 to capture an image with the image capture section 94. By this process, the image capture section 94 controls the composition by pan/tilt/zoom based on the camerawork control information, captures an image with the controlled composition, and outputs to the image acquisition section 95.

In step S74, the control section 92 controls the image acquisition section 95 to acquire and temporarily store the image captured by the image capture section 94, and causes the image to be output to the image transmission section 96 while making adjustments such that overflow and underflow do not occur.

In step S75, the control section 92 controls the image transmission section 96 to transmit the image supplied by the image acquisition section 95 to the switcher apparatus 11.

In step S76, the control section 92 determines whether or not an instruction to end the process has been issued, and in the case in which an instruction to end has not been issued, the process returns to step S71, and the process from step S71 to S76 is repeated until an instruction to end is issued.

Subsequently, in step S76, when an instruction to end the process is issued, the process ends.

Note that for the manual camera 15, instead of the processes in steps S71 and S72, the control section 112 controls the image capture section 114 according to an operation signal from the operation section 111 responsive to operations by the camera staff, which corresponds to camerawork control information. Since the process thereafter is similar to the process from step S73 to S76, a description thereof is omitted.

By the above process, the images captured by the robot cameras 14 and the manual camera 15 are transmitted to the switcher apparatus 11.

According to this process, in step S41, the control section 31 controls the image reception section 36 to receive the images transmitted by all robot cameras 14 and the manual camera 15.

In step S42, the control section 31 controls the image reception section 36 to cause the storage section 34 to store the received images in the image data storage section 72 in association with the identifiers of the robot cameras 14.

In step S43, the control section 31 determines whether or not an instruction to end has been issued, and in the case in which an instruction to end has not been issued, the process returns to step S31. In other words, the process from step S31 to S43 is repeated until an instruction to end the process is issued.

Subsequently, in step S43, when an instruction to end the process is issued, the process ends.

Figure 12:
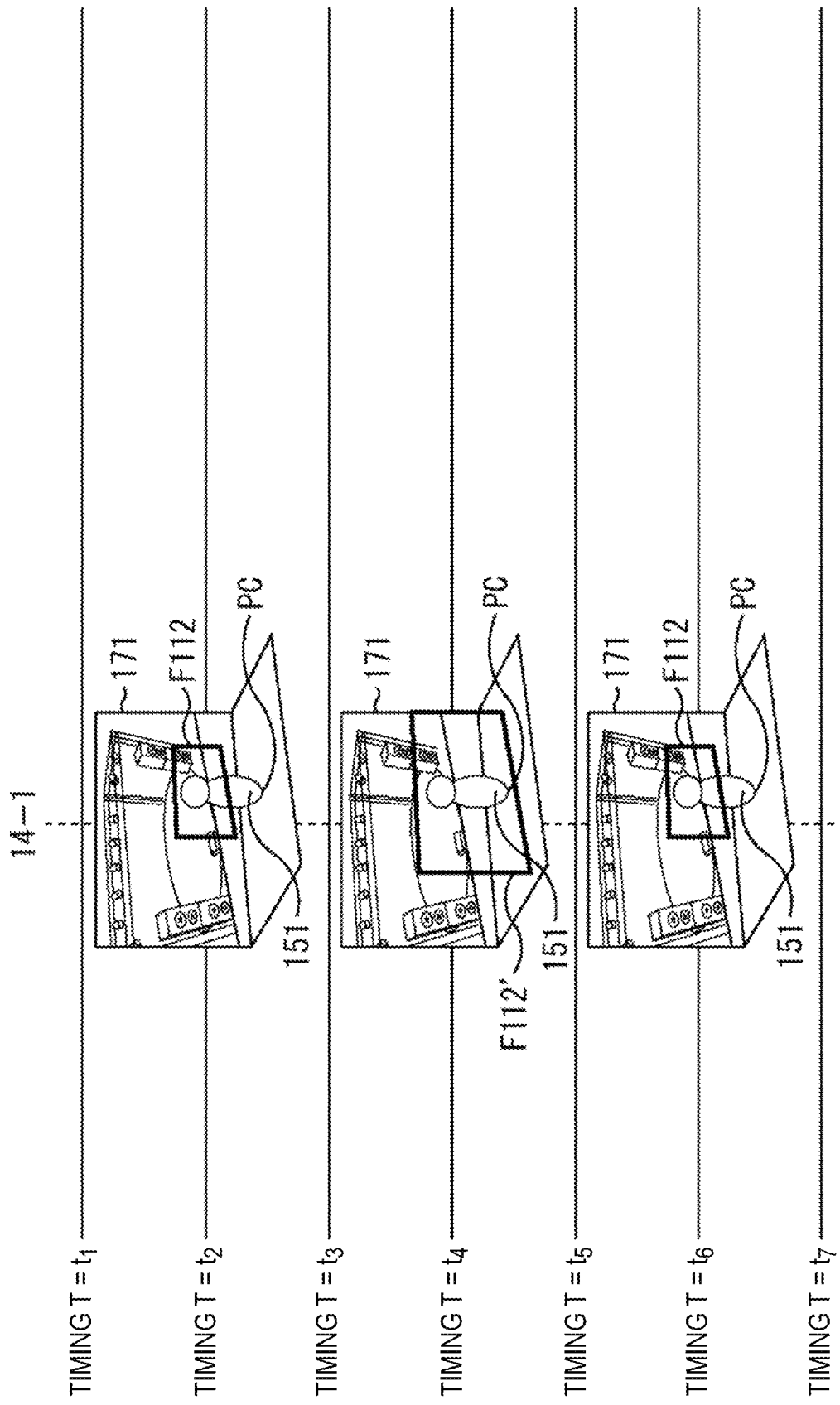
FIG. 12 is a diagram explaining the camerawork control process of the first embodiment.

By the above process, for example, the case of not using the position information of the sensor apparatus 16, for example, the case of using the camerawork information table set TS including camerawork information like that illustrated in FIG. 12 will be considered.

In FIG. 12, at the timings T=t1 to t3, there is registered camerawork information in which the pan, tilt, and zoom are set such that image capture is executed with a composition whereby, inside the image F112 captured by the robot camera 14, the upper body of the subject 151 assumed to exist at the center position PC on the stage 171 is contained inside the image in the vertical direction, and in addition, the subject is positioned at a center position in the horizontal direction.

Also, at the timings T=t3 to t5, there is registered camerawork information in which the pan, tilt, and zoom are set such that image capture is executed with a composition whereby, inside the image F112 captured by the robot camera 14, the full body of the subject 151 assumed to exist at the center position PC on the stage 171 is contained inside the frame in the vertical direction, and in addition, the subject is positioned at a center position in the horizontal direction.

Furthermore, at the timings T=t5 to t7, there is registered camerawork information in which the pan, tilt, and zoom are set such that image capture is executed with a composition whereby, inside the image F112 captured by the robot camera 14, the upper body of the subject 151 assumed to exist at the center position PC on the stage 171 is contained inside the frame in the vertical direction, and in addition, the subject is positioned at a center position in the horizontal direction.

Herein, since the camerawork information table set of FIG. 12 is camerawork information assuming that the subject 151 exists at the position PC in the center of the stage 171, if the subject 151 correctly exists at the position PC, appropriate images can be generated.

However, when the position of the subject 151 is not the position PC, there is a possibility of being unable to capture appropriate images.

Figure 13:
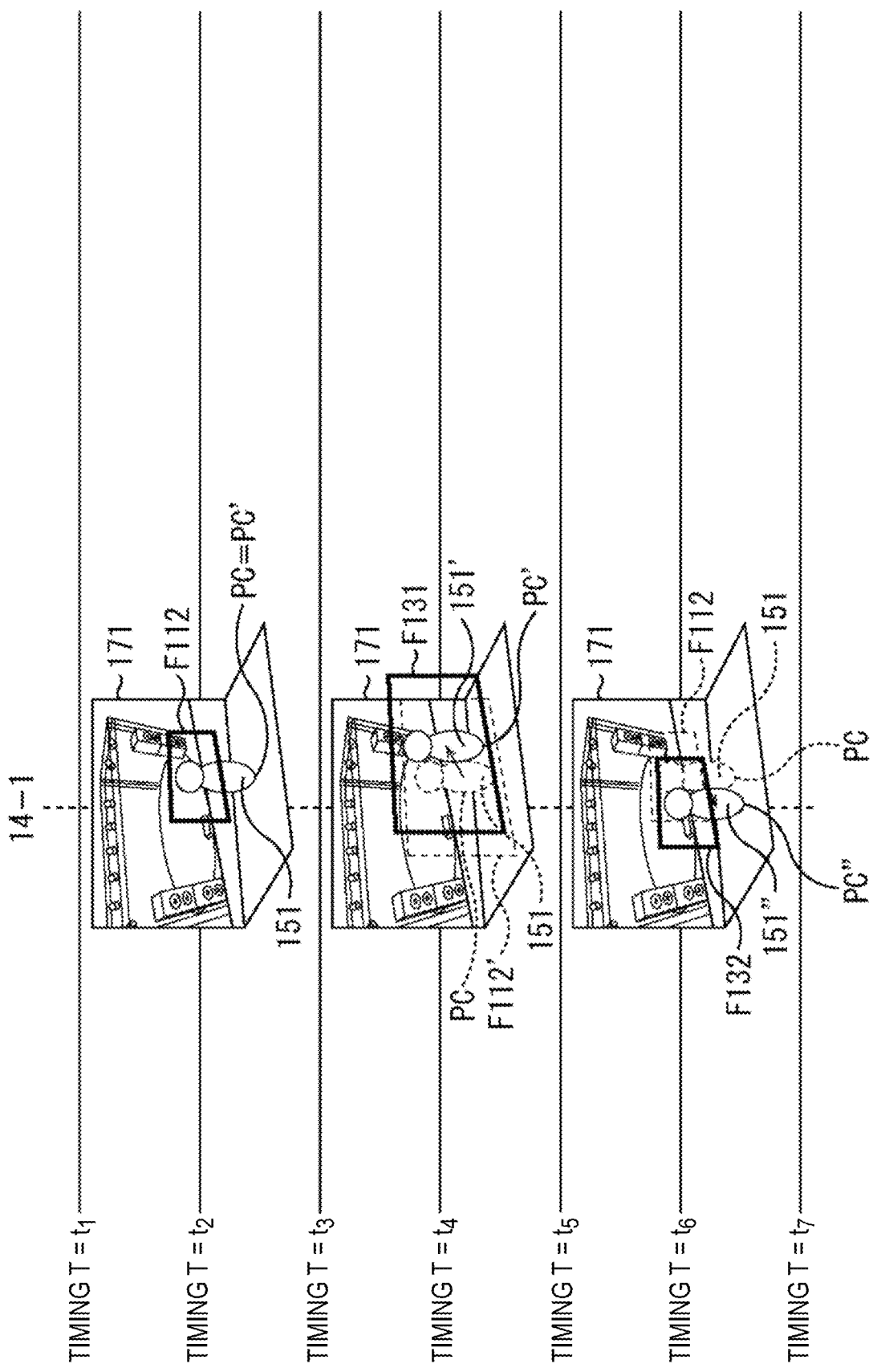
FIG. 13 is a diagram explaining the camerawork control process of the first embodiment.

To this point, in the case of utilizing position information, as illustrated in FIG. 13, adaptive image capture according to the position of the subject 151 becomes possible.

In other words, as illustrated in FIG. 13, for example, at the timings T=t1 to t3, in the case in which a position PC' where the subject 151 actually exists matches the assumed position PC, the subject 151 can be captured with the expected composition (angle of view) of the subject, similarly to the case described with reference to FIG. 12.

However, at the timings T=t3 to t5 of FIG. 13, in the case in which an actual subject 151' exists at the position PC' shifted from the position PC where the subject 151 is assumed to exist, on the basis of position information about the position PC', the image captured according to computations as illustrated by Formula (2), such as when λ=1, for example, becomes an image of the composition illustrated not by the image F112' in the case of assuming that the subject 151 exists at the position PC, but instead by the image F131 corresponding to the position information about the position PC' where the subject 151' actually exists.

Furthermore, at the timings T=t5 to t7 of FIG. 13, in the case in which the subject 151 actually exists as the subject 151″ at a position PC″ shifted from the assumed position PC, on the basis of position information about the position PC″, the image captured according to computations as illustrated by Formula (2), such as when λ=1, for example, becomes an image of the composition illustrated not by the image F112 in the case in which the subject 151 actually exists at the position PC, but instead by an image F132 corresponding to the position information about the position PC″ where the subject 151″ exists.

In this way, by utilizing the position information, it becomes possible to add a correction associated with the position information to the camerawork information preset in the camerawork information table set. Note that in FIG. 13, the weight λ=1 is given as an example, but by varying the weight over the range from 0 to 1, it becomes possible to adjust positions intermediate between an image with the composition captured by the camerawork information for the position information where the subject 151 is assumed to exist, and an image with the composition captured by the camerawork information captured by the current position information. Consequently, an adaptive process to the extent the weight λ is large can be achieved.

Note that the images F112 and F112' illustrated by the dashed lines in FIG. 13 correspond to the images F112 and F112' in FIG. 12.

Also, for example, in the case in which the image capture target is a sports broadcast of a basketball game, a camerawork information table set that controls the composition such that the entire range in which players exist is contained inside the image may be prepared with respect to a first robot camera 14, and a camerawork information table set that controls the composition such that the area around the basketball is contained may be prepared with respect to a second robot camera 14.

Figure 14:
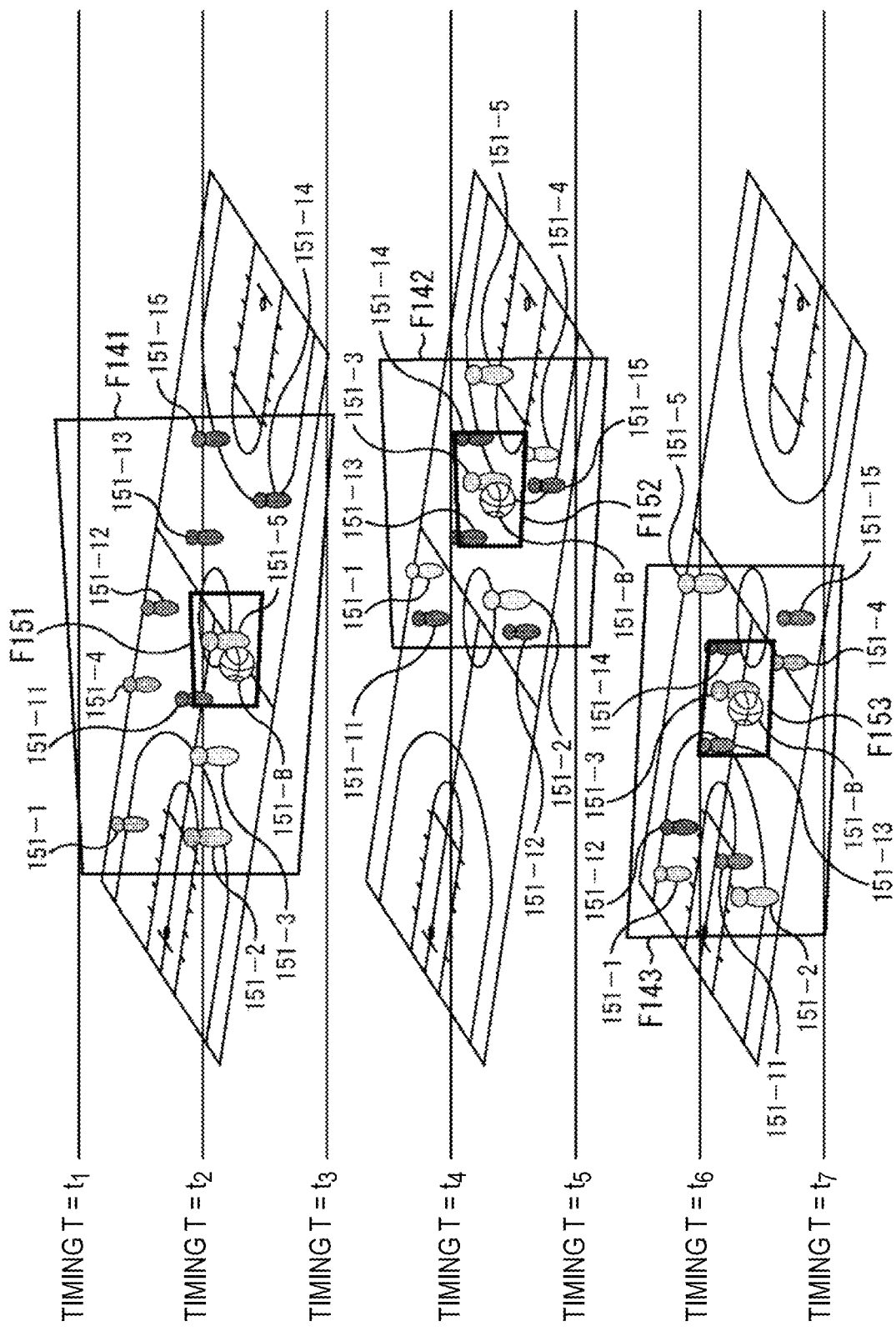
FIG. 14 is a diagram explaining the camerawork control process of the first embodiment.

In this case, as illustrated in FIG. 14, at the timings T=t1 to t3, an image F141 with a composition such that all players are contained inside the image is captured by the first robot camera 14 on the basis of position information about where subjects 151-1 to 151-5 and 151-11 to 151-15 including basketball players exist. At the same time, an image F151 that is zoomed in on the area around a subject 151-B including a basketball B is captured by the second robot camera 14 on the basis of position information about the basketball B.

Also, as illustrated in FIG. 14, at the timings T=t3 to t5, an image F132 with a composition such that all players are contained inside the image is captured by the first robot camera 14 on the basis of position information about where the subjects 151-1 to 151-5 and 151-11 to 151-15 including basketball players exist. At the same time, an image F152 with a composition that is zoomed in on the area around a subject 151-B including the basketball B is captured by the second robot camera 14 on the basis of position information about the basketball B.

Similarly, as illustrated in FIG. 14, at the timings T=t5 to t7, an image F143 with a composition such that all players are contained inside the image is captured by the first robot camera 14 on the basis of position information about where the subjects 151-1 to 151-5 and 151-11 to 151-15 including basketball players exist. At the same time, an image F153 with a composition such that the area around the subject 151-B including the basketball B is contained is captured by the second robot camera 14 on the basis of position information about the basketball B.

However, in the sports broadcast described with reference to FIG. 14, the position of each of the player subjects 151-1 to 151-5 and 151-11 to 151-15 as well as the basketball B subject 151-B cannot be assumed to be a specific position. For this reason, in the case of not using position information, each piece of camerawork information in the camerawork information table sets for the first and second robot cameras 14 need to be set to images with a composition such that the entire basketball court is captured, for example.

Also, in the case of causing the entire basketball court to be captured in the state of not using position information, when position information is used, it is necessary to set the weight λ to a value close to 1 in Formula (2).

By the above process, by executing image capture by selecting a camerawork information tablet set corresponding to the image capture target to capture from among the camerawork information table sets stored in the camerawork information table set storage section 71, it becomes possible to capture images while switching the preset camerawork information, or in other words, change the corresponding pan/tilt/zoom to vary the composition, according to the elapsed time since the start of the image capture. Also, by using subject position information in addition to camerawork information, it becomes possible to capture images with a composition corresponding to the motion of a subject, according to the passage of time related to image capture (following the flow associated with the passage of time of the captured image capture target).

As a result, when controlling multiple robot cameras, it becomes possible to achieve camerawork corresponding to changes in various conditions.

2. Second Embodiment

The above describes an example of using a fixed camerawork information table set according to the image capture target to capture, but multiple different camerawork information table sets to use for image capture of the same image capture target may also be prepared and switched among for use according to external information.

Figure 15:
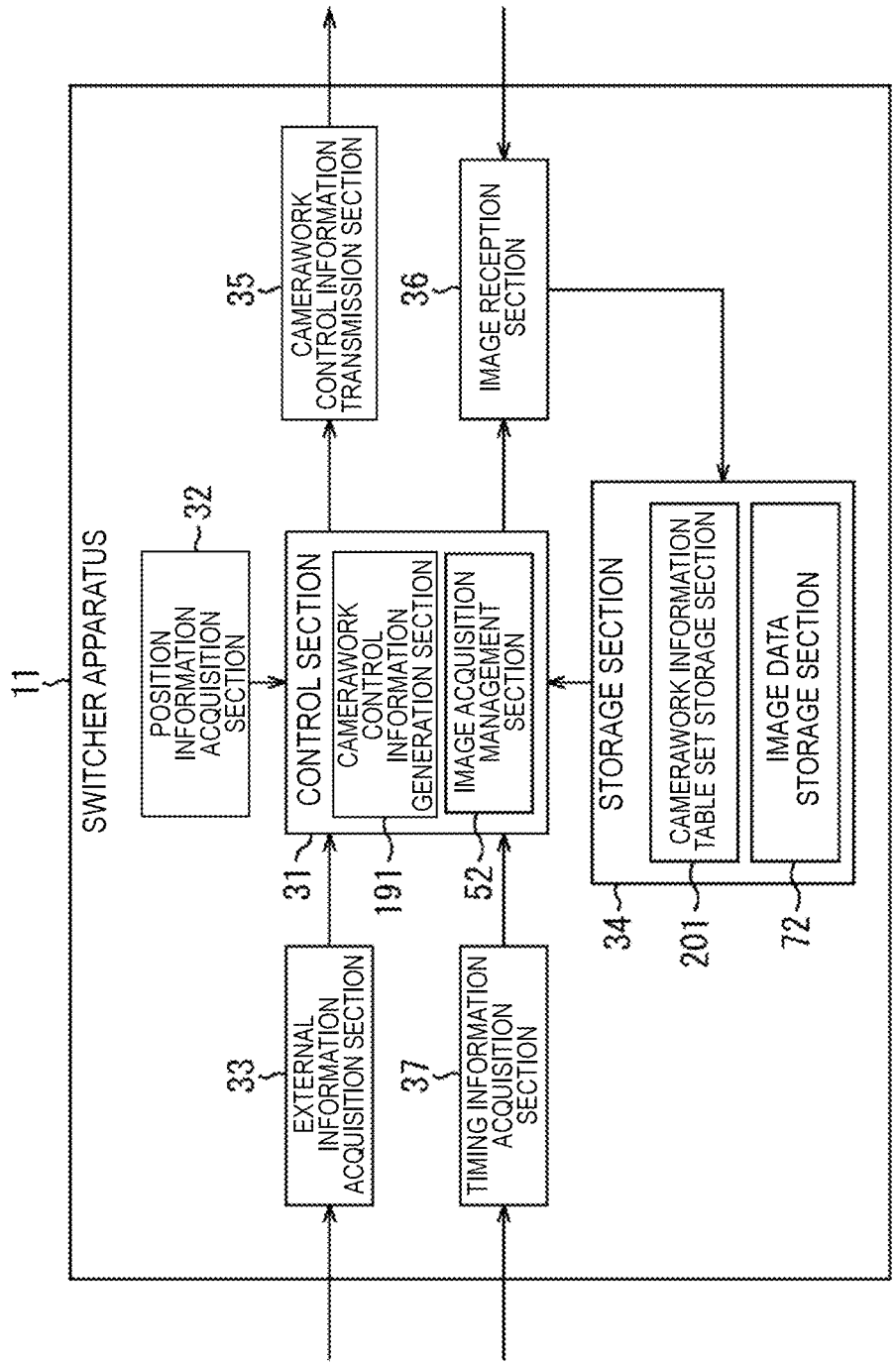
FIG. 15 is a diagram illustrating an exemplary configuration of a second embodiment of a switcher apparatus.

FIG. 15 illustrates an exemplary configuration of the switcher apparatus 11 in which multiple different camerawork information table sets to use for image capture of the same image capture target are prepared and switched among for use according to external information.

In the switcher apparatus 11 of FIG. 15, the points that differ from the switcher apparatus 11 of FIG. 2 are that in the control section 31, instead of the camerawork control information generation section 51, a camerawork control information generation section 191 is provided, and instead of the camerawork information table set storage section 71, a camerawork information table set storage section 201 storing multiple camerawork information table sets for the same image capture target is stored in the storage section 34.

In other words, the camerawork control information generation section 191 has the same basic functions as the camerawork control information generation section 51, but in addition, for example, after a predetermined time elapses from the start of the camerawork control process, the camerawork control information generation section 191 switches the camerawork information table set which is set for the same image capture target stored in the camerawork information table set storage section 201 stored in the storage section 34, on the basis of external information supplied by the external information acquisition section 33.

Note that since the configuration of the reception section 12, the external information supply section 13, the robot camera 14, the manual camera 15, and the sensor apparatus 16 is the same as the first embodiment, a description thereof is omitted.

<Camerawork Control Process by Switcher Apparatus of FIG. 15>

Figure 16:
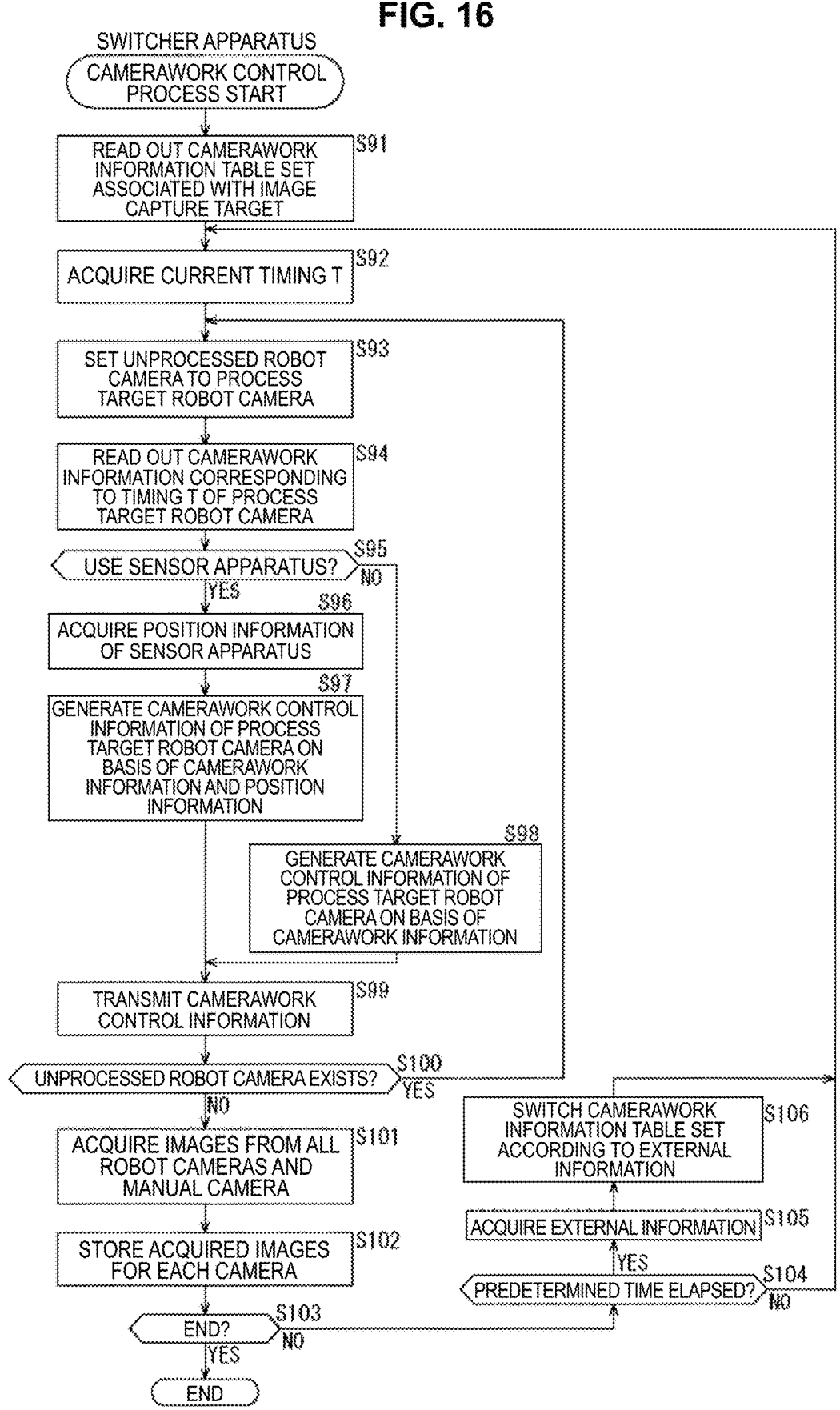
FIG. 16 is a flowchart explaining a camerawork control process of the second embodiment.

Next, the flowchart in FIG. 16 will be referenced to describe a camerawork control process by the switcher apparatus 11 of FIG. 15.

Note that in the flowchart in FIG. 16, since the process from step S91 to S102 is similar to the process from step S31 to S43 of FIG. 10, a description thereof is omitted.

In other words, in step S104, the camerawork control information generation section 191 determines whether or not a predetermined time has elapsed, and in the case in which the predetermined time has not elapsed, the process returns to the process in step S91. Also, in step S104, in the case in which the predetermined time has elapsed, the process proceeds to step S105.

In step S105, the camerawork control information generation section 191 controls the external information acquisition section 33 to acquire external information supplied by the external information supply section 13.

In step S106, on the basis of the acquired external information, the camerawork control information generation section 191 switches the camerawork information tablet set which is set for the same image capture target stored in the camerawork information table set storage section 201 stored in the storage section 34, and the process returns to step S91.

Figure 17:
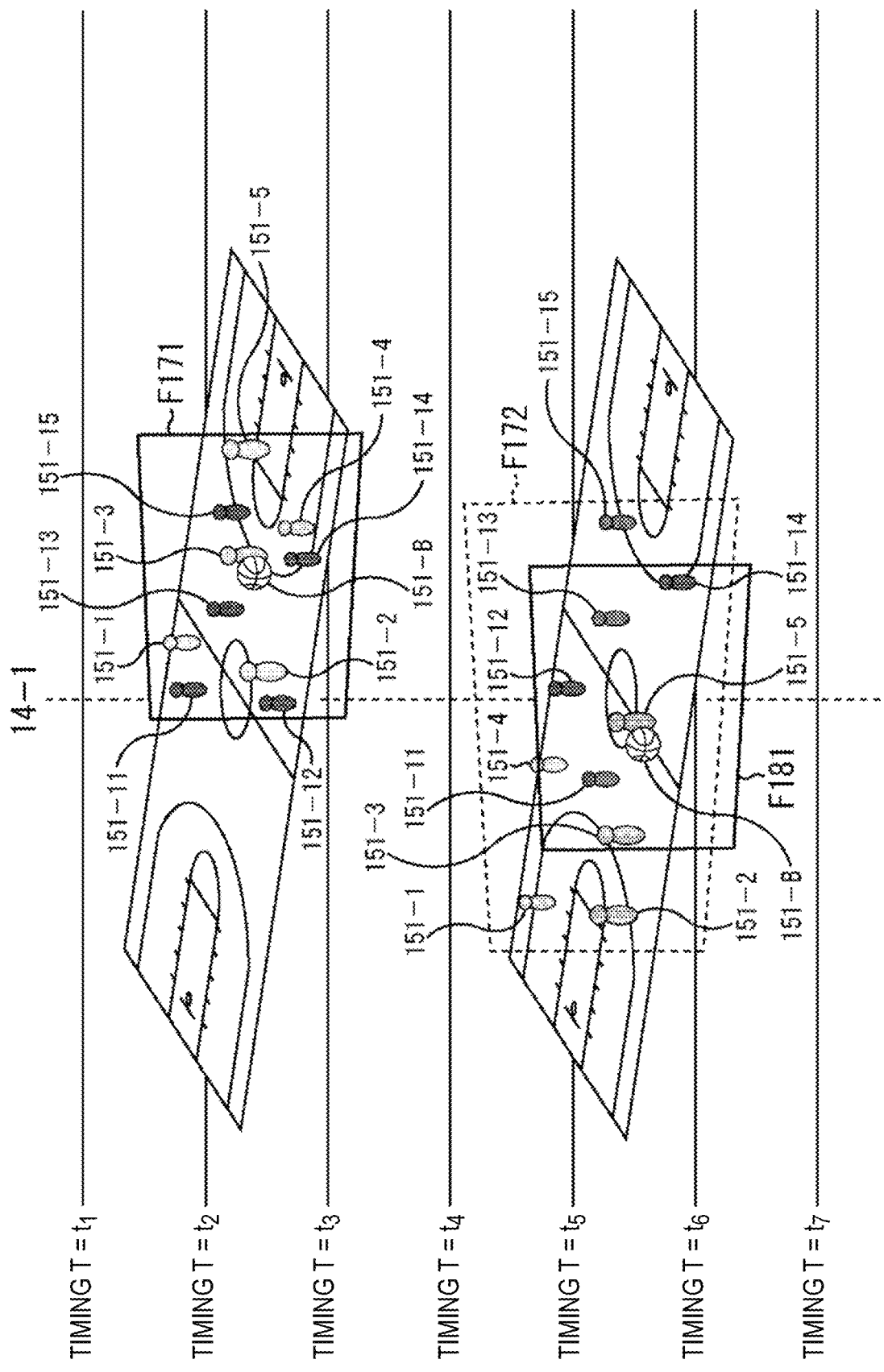
FIG. 17 is a diagram explaining the camerawork control process of the second embodiment.

In other words, for example, as illustrated in FIG. 17, in the first camerawork information table set, at the timings T from t1 to t4, an image F171 with a composition such that all players are contained inside the image is captured on the basis of position information about where the subjects 151-1 to 151-5 and 151-11 to 151-15 including basketball players exist.

In contrast, when the predetermined time elapses when the timing T is t4, for example, at a timing when time has elapsed since the start of the game, the first half of the game ends, and the second half begins, on the basis of the external information, when the player corresponding to the subject 151-5 has scored the most points in the first half of the game, the camerawork information table set is switched to a camerawork information table set that controls the composition such that the area around the subject 151-5, namely, the prominent player who has scored the most points, is contained. With such an arrangement, at the timings T from t4 to t7, control can be executed such that an image with the composition illustrated by the image F181 is captured.

Note that in the case in which the camerawork information table set cannot be switched, at the timings T from t4 to t7, on the basis of the position information about where the subjects 151-1 to 151-5 and 151-11 to 151-15 including basketball players exist, an image F172 with the composition illustrated by the dashed line is captured such that all players are contained inside the image, and even though the prominent player is playing, one is unable to find where the prominent player is in the image at a glance.

Consequently, by switching the camerawork information table set in this way, in the first half of the game, it becomes possible to control the composition such that all players are contained, while in the second half of the game, it becomes possible to control the composition such that a highly prominent player who has scored the most points in the first half of the game is centered on, making it possible to capture images with a composition that engages viewers.

By the above process, by switching the camerawork information table set in accordance with external information as the game proceeds, it becomes possible to apply changes to the camerawork according to the progress of the game and the external information.

The foregoing describes an example in which the image capture target is taken to be a sports broadcast, and a basketball game is captured by the robot camera control system in FIG. 1, but the game may also be of a different sport, such as volleyball, soccer, baseball, and the like. Also, broadcasts of horse racing, bicycle racing, speedboat racing, and the like are also possible, and for example, the camerawork information table set may be switched for each of immediately after the start, the middle game, and the end game. In other words, immediately after starting, the camerawork information table set may be set to one in which the composition is controlled such that all subjects including all competitors are contained, while in the middle game, the camerawork information table set may be set to one in which the composition is controlled such that subjects including competitors in the leading pack are contained, and in the end game, the camerawork information table set may be set to one in which the composition is controlled such that subjects including the few competitors competing for the top position are contained.

Also, the foregoing describes an example of switching the camerawork information table set on the basis of external information when a predetermined time elapses, but the camerawork information table set may also be switched when a change occurs in the external information. In other words, in the case of broadcasting a basketball game, every time the score is overtaken according to external information, the camerawork information table set may be switched to use one that controls the composition such that an active player on the winning team is centered on.

Note that the foregoing describes an example of using a record of player activity (for example, stats information) from the start of the camerawork control process until a predetermined time elapses as the external information, but other external information is also acceptable, and for example, in the case of a live music performance or the like, when a group including multiple artists is treated as the subject, the composition may be controlled on the basis of a musical score such that only a subject including the artists who are currently singing is contained in the image.

Figure 18:
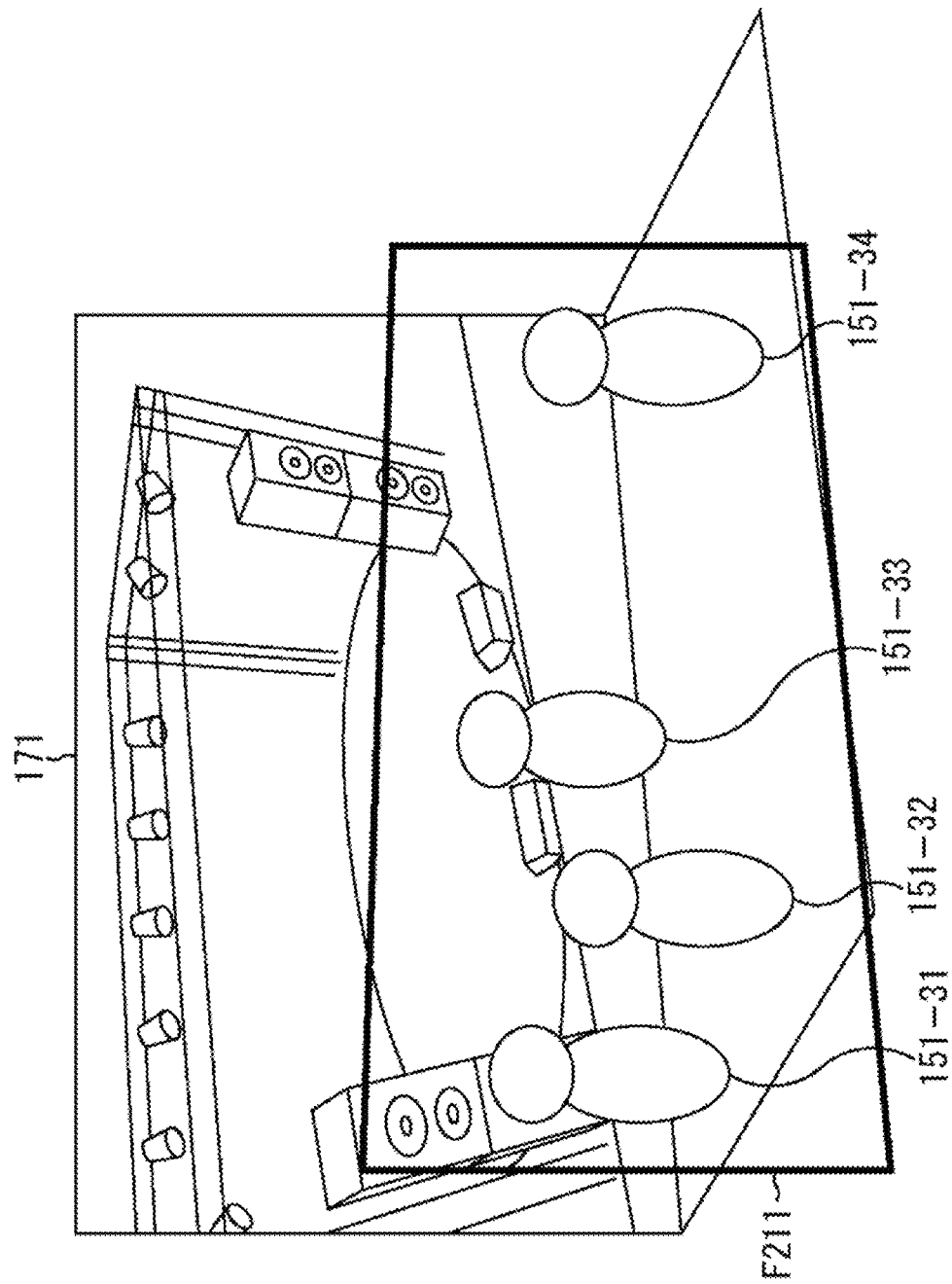
FIG. 18 is a diagram explaining the camerawork control process of the second embodiment.

In other words, in the case in which the image capture target is a live music performance, in the initial camerawork information table set, assume that, as illustrated in FIG. 18, on the basis of position information about where subjects 151-31 to 151-34 including artists on the stage 171 exist, an image F211 with a composition such that all are contained is captured.

Figure 19:
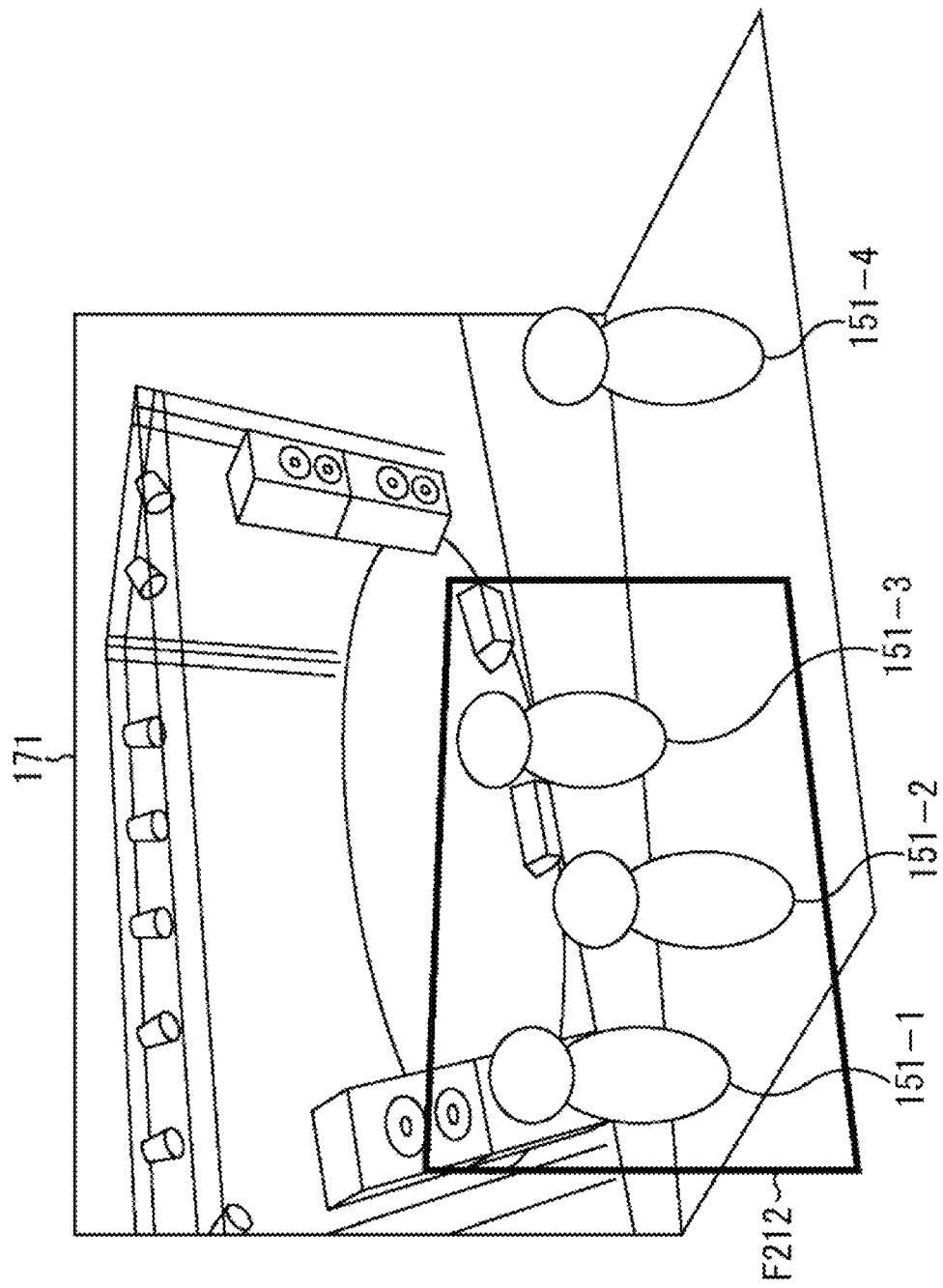
FIG. 19 is a diagram explaining the camerawork control process of the second embodiment.

Additionally, on the basis of the musical score, upon reaching a timing at which the subjects 151-31 to 151-33 are singing while the subject 151-34 is not singing, the camerawork information table set may be switched, and thereafter, as illustrated in FIG. 19, on the basis of position information about where the subjects 151-31 to 151-33 who are the artists singing on the stage 171 exist, the composition may be controlled to capture an image F212 with a composition such that the three artists of the subjects 151-31 to 151-33 are contained.

With such an arrangement, it becomes possible to control image capture matching the progress of the musical performance, such that an image with a composition centered on the subjects 151-31 to 151-33 including the highly prominent artists who are currently singing on the stage 171 is captured.

The foregoing describes an example of switching the camerawork information table set on the basis of a musical score in a live music performance, but the camerawork information table set may also be switched at each of immediately after the start, the middle, and the end of the live music performance, for example.

The foregoing describes an example of switching the camerawork information table set on the basis of external information, but the camerawork information table set may also be switched on the basis of information other than external information. For example, instead of the external information, an image captured by the manual camera 15 may be referenced, and for the robot camera 14 that captures an image with a composition resembling the composition of the image captured by the manual camera 15, a camerawork information table set which includes camerawork information different from the composition captured by the manual camera 15 and which is also other than the camerawork information table sets of the other robot cameras 14 may be selected. With such an arrangement, the duplicate capture of images with similar composition by the manual camera 15 and the robot camera 14 may be prevented.

3. Third Embodiment

The foregoing describes an example in which multiple camerawork information table sets are prepared in association with external information, and the camerawork information table set is switched according to a change in the external information attendant on the passage of time, but since the position of a subject is based on position information detected by the sensor apparatus 16, there is a possibility that the composition is not an anticipated one for capturing the actual subject. Accordingly, in the case in which an image with such an unanticipated composition is captured, a correction may be executed to bring the composition closer to the anticipated composition.

In other words, for example, in the case of a live music performance, camerawork control information that controls the pan/tilt/zoom is generated on the basis of the position information of the sensor apparatus 16 carried by the artist treated as the subject and the camerawork information, but with only the position information of the subject, the height and the like of the artist who is the subject is not taken into account. For this reason, even if a camerawork control signal is generated to capture an image with a composition such that the full body of the subject is contained in the vertical direction of the captured image, in the case in of a tall artist, for example, it is conceivable that the actually captured image may be in a state in which the head and feet of the artist who is the subject is not contained inside the image, and image capture by the anticipated composition cannot be achieved.

Accordingly, the subject may be recognized from an actually captured image, whether or not image capture with the anticipated composition has been achieved may be verified, and in the case of an unanticipated composition, the camerawork control information may be corrected such that image capture with the anticipated composition can be achieved appropriately.

Figure 20:
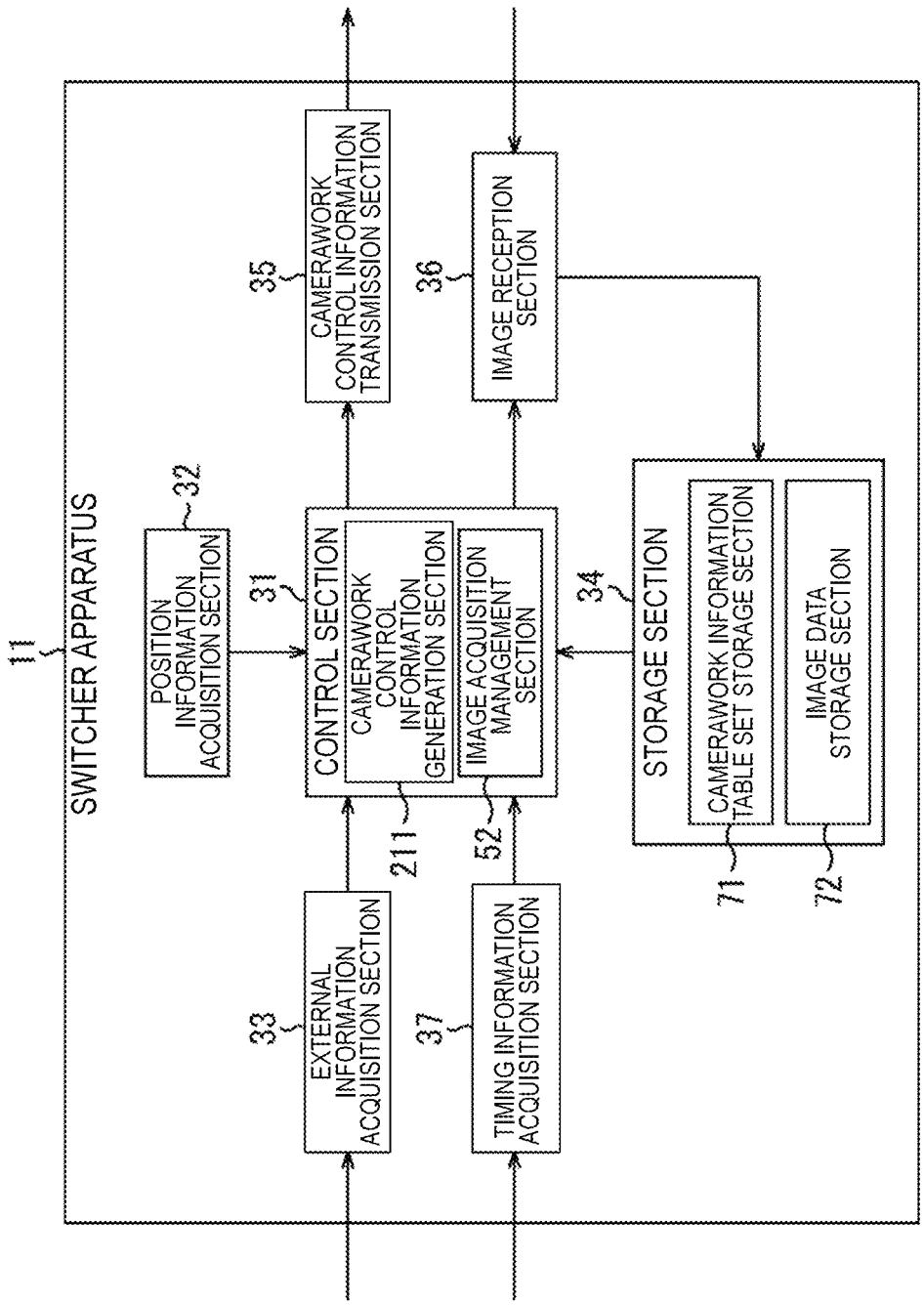
FIG. 20 is a diagram illustrating an exemplary configuration of a third embodiment of a switcher apparatus.

FIG. 20 illustrates an exemplary configuration of the switcher apparatus 11 configured to detect the subject from a captured image, verify whether or not image capture with the anticipated composition has been achieved, and in the case of an image with an unanticipated composition, correct the camerawork control information such that image capture with the anticipated composition can be achieved appropriately.

In the switcher apparatus 11 of FIG. 20, the points that differ from the switcher apparatus 11 of FIG. 2 are that in the control section 31, instead of the camerawork control information generation section 51, a camerawork control information generation section 211 is provided.

The basic configuration is similar to the camerawork control information generation section 51, but the camerawork control information generation section 211 reads out the previously captured image stored in the image data storage section 72 of the storage section 34, determines whether or not the image captured in each robot camera 14 is an image with the anticipated composition, and in the case in which an image has not been captured with the anticipated composition, in a subsequent process, the camerawork control information generation section 211 corrects the camerawork control information such that an image with the anticipated composition can be captured.

More specifically, the camerawork control information generation section 211 reads out the camerawork information used in the previous image capture from among the camerawork information table sets of the specified image capture target, and when, for example, control is specified to achieve a composition such that the full body or the upper body of the subject in the vertical direction is contained in the image to capture as the image with the anticipated composition, the camerawork control information generation section 211 determines whether or not the image has the anticipated composition on the basis of whether or not the full body or the upper body of the subject is captured in the vertical direction of the image to capture.

Also, for example, when the camerawork information specifies that the subject is to be captured at a position on the right, a center position, or a position on the left inside the image to capture as the image with the anticipated composition, the camerawork control information generation section 211 determines whether or not the image has the anticipated composition on the basis of whether or not the subject is captured at a position on the right, a center position, or a position on the left inside the image to capture.

Furthermore, for example, when it is specified that all of multiple subjects or a specific subject is to be captured in the entire image to capture as the image with the anticipated composition, the camerawork control information generation section 211 determines whether or not the image has the anticipated composition on the basis of whether or not all of the multiple subjects or the specific subject are captured inside the image to capture.

<Camerawork Control Process by Switcher Apparatus of FIG. 20>

Figure 21:
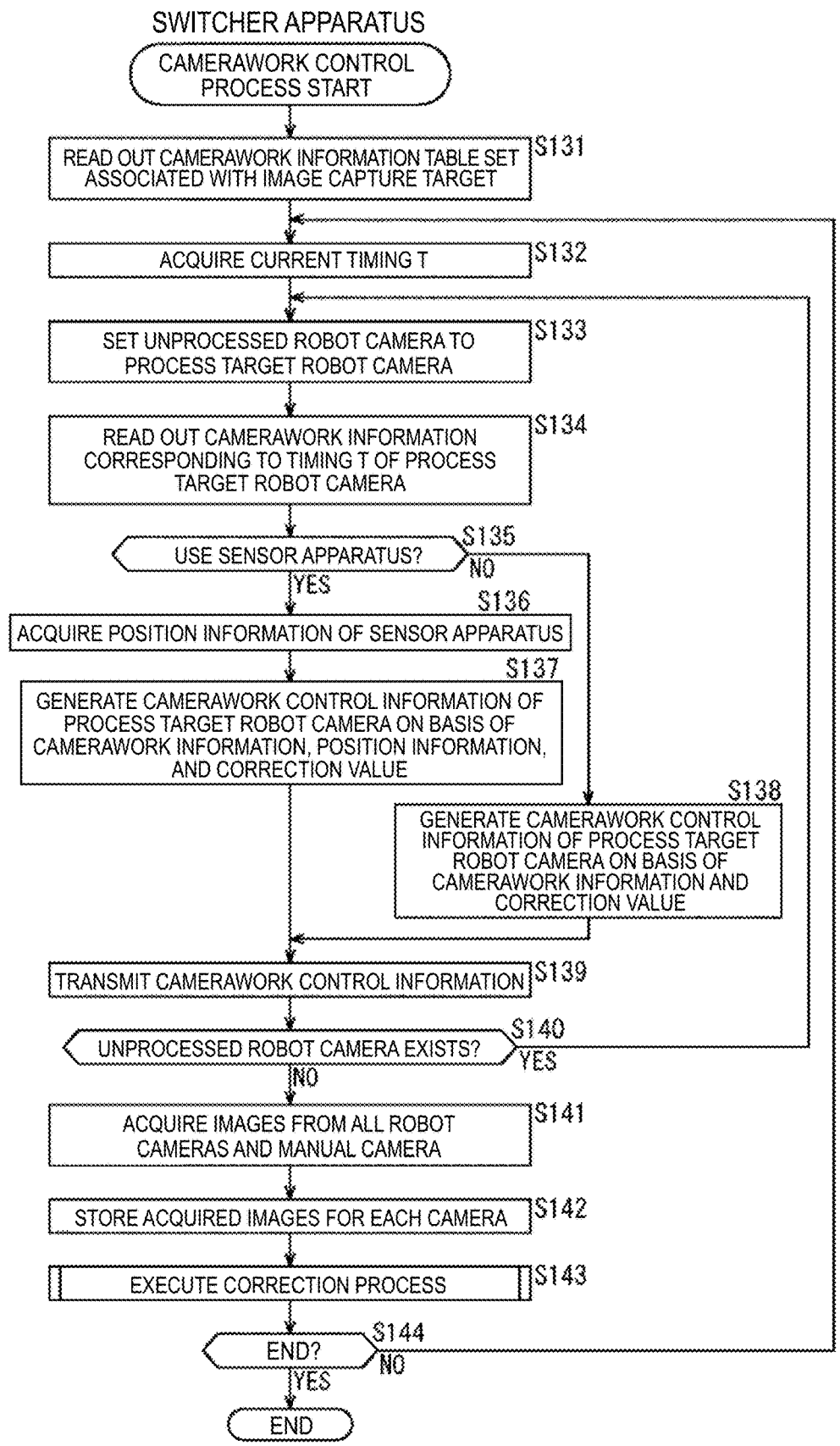
FIG. 21 is a flowchart explaining a camerawork control process of the third embodiment.

Next, the flowchart in FIG. 21 will be referenced to describe a camerawork control process by the switcher apparatus 11 of FIG. 20.

Note that in the flowchart in FIG. 21, since the process from step S131 to S142 and S144 is similar to the process from step S31 to S43 of FIG. 10, a description thereof is omitted. However, regarding the process of steps S137 and S138, in the case in which a correction value computed by the correction process described later exists, camerawork control information taking the correction value into account is generated.

In other words, the process of FIG. 21 differs from the process of FIG. 10 in that the process of step S143 is provided.

In step S143, the camerawork control information generation section 211 executes the correction process, detects the subject from a captured image, verifies whether or not image capture with the anticipated composition has been achieved, and in the case of an unanticipated image, the camerawork control information generation section 211 generates a correction value for correcting the camerawork control information, and computes the pan, tilt, and zoom using the correction value in the following process.

<Correction Process>

Figure 22:
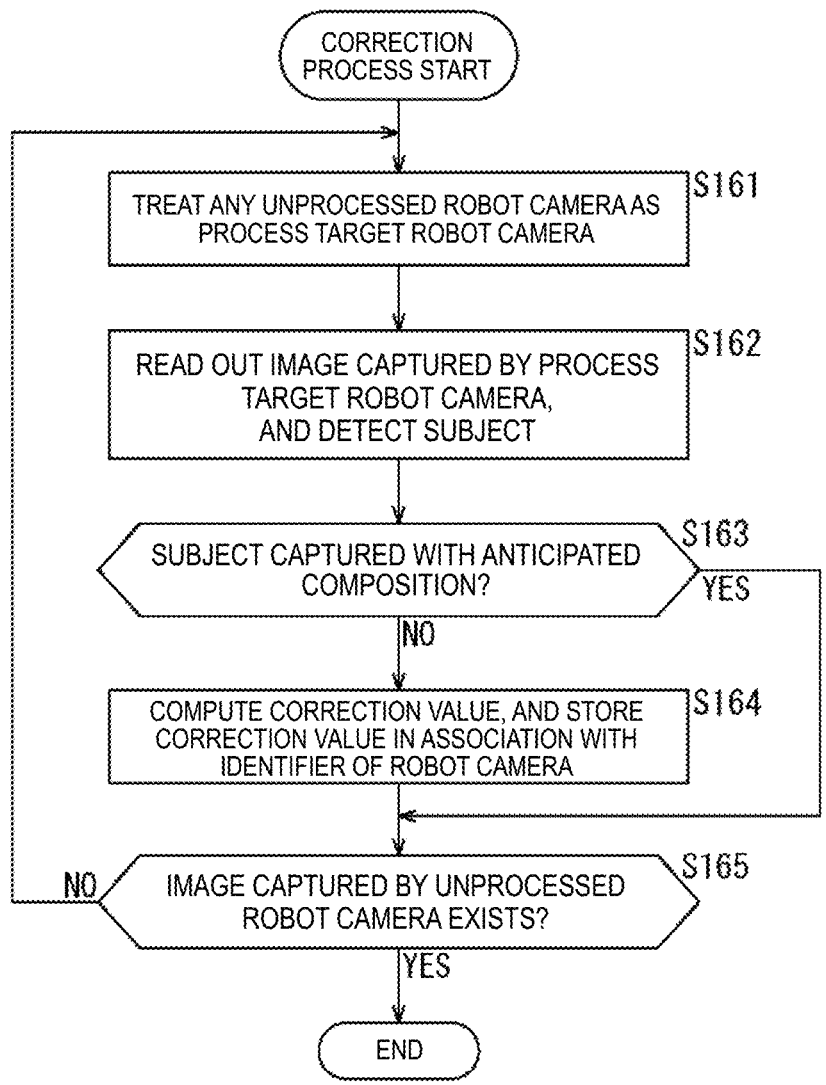
FIG. 22 is a flowchart explaining a correction process of the third embodiment.

Herein, the flowchart in FIG. 22 will be referenced to describe the correction process.

In step S161, the camerawork control information generation section 211 sets an unprocessed robot cameras 14 among the robot cameras 14 as the process target robot camera 14.

In step S162, the camerawork control information generation section 211 reads out the latest image captured by the process target robot camera 14 from among the images stored in the image data storage section 72 in the storage section 34, and recognizes the subject.

In step S163, the camerawork control information generation section 211 reads out the camerawork information of the process target robot camera 14 corresponding to the read-out image from the camerawork information table set storage section 71, and on the basis of the position of the subject inside the read-out image, determines whether or not the image is one with the anticipated composition.

In step S163, in the case of determining that the read-out latest image is not an image with the anticipated composition, the process proceeds to step S164.

In step S164, the camerawork control information generation section 211 computes a correction value that corrects the image to one with the anticipated composition, and stores the correction value in association with an identifier that identifies the robot camera 14.

More specifically, for example, in the case in which a composition whereby the full body of the subject is contained in the vertical direction of the image to capture is specified, but image capture is being controlled with a composition whereby the full body of the subject is not contained in the vertical direction of the image to capture, the camerawork control information generation section 211 computes, from the relationship between the position information about the subject and one's own position, a correction value that changes the zoom factor slightly by a predetermined factor so that the entirety of the subject is contained inside the image. Note that in the following process, in the process of generating the camerawork control information, camerawork control information about the zoom factor including the computed correction value is generated.

In step S165, the camerawork control information generation section 211 determines whether or not a latest image captured by an unprocessed robot camera 14 exists among the latest images stored in the image data storage section 72 in the storage section 34, and in the case in which an image captured by an unprocessed robot camera 14 exists, the process returns to step S161. In other words, the process from step S161 to S165 is repeated until the process is performed on the images captured by all robot cameras 14 stored in the image data storage section 72 in the storage section 34.

Additionally, in step S165, in the case in which the process is considered to have been performed on the latest images captured by all robot cameras 14 stored in the image data storage section 72 in the storage section 34, the process ends.

When a correction value is computed by the above process, when generating the camerawork control information in the process of steps S137 and S138, the camerawork control information generation section 211 generates the camerawork control information using the correction value stored in association with the identifier that identifies the robot camera 14 set as the process target. In other words, in the case in which an image is being captured with a composition whereby the full body of the subject is not contained in the vertical direction of the image to capture, from the relationship between the position information about the subject and one's own position, a value that changes the zoom factor slightly by a predetermined factor so that the entirety of the subject is contained inside the image is computed as the correction value for correcting the composition, and camerawork control information is generated using the correction value for correcting the composition.

However, even if the camerawork control information using the correction value computed at this time is used, cases are anticipated in which an image is captured again with a composition whereby the full body of the subject is not contained in the vertical direction of the image to capture. However, by repeating a similar process until an image is captured with a composition in the state in which the full body of the subject is contained in the vertical direction of the image to capture, an image becomes captured with the composition whereby the full body of the subject is contained in the vertical direction of the image to capture.

As above, in the robot camera control system of the present disclosure, it becomes possible to achieve appropriate camerawork according to the passage of time related to the capture of an image capture target using multiple robot cameras, and changes in external information.

<Example of Execution by Software>

Incidentally, the above series of processes can, for example, be executed by hardware, or can be executed by software. In the case where the series of processes is executed by software, a program configuring this software is installed in a computer included in dedicated hardware, or a general-purpose personal computer which can execute various functions when various programs are installed, etc., from a recording medium.

Figure 23:
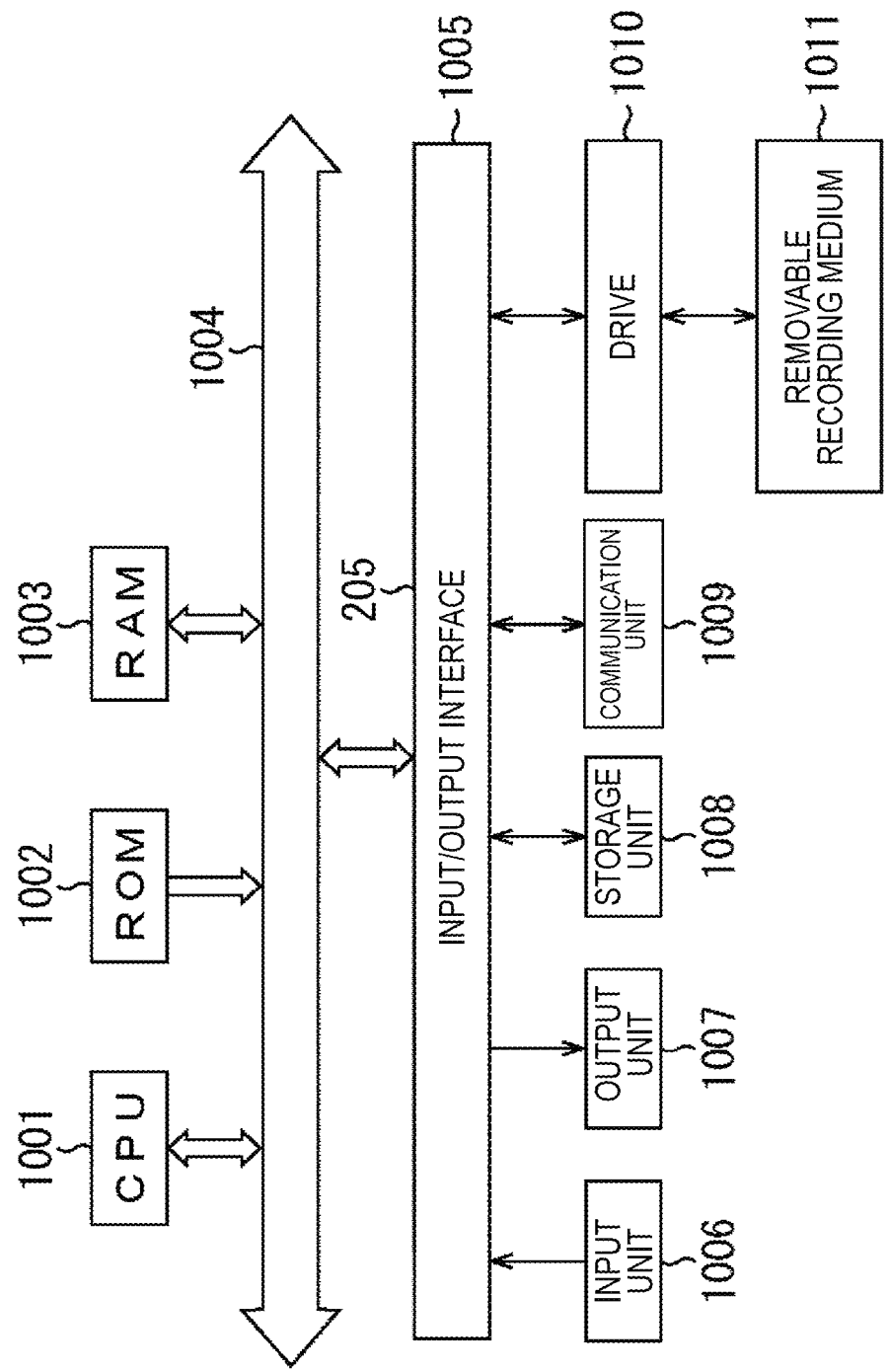
FIG. 23 is a diagram explaining an exemplary configuration of a general-purpose personal computer.

FIG. 23 shows an example configuration of a general-purpose personal computer. The computer includes a CPU (Central Processing Unit) 1001. An input/output interface 1005 is connected to the CPU 1001 through a bus 1004. A ROM (Read Only Memory) 1002 and a RAM (Random Access Memory) 1003 are connected to the bus 1004.

An input unit 1006 including an input device, such as a keyboard, a mouse, etc., which is used by the user to input an operation command, an output unit 1007 which outputs a process operation screen or an image of a process result to a display device, a storage unit 1008 including a hard disk drive etc. which stores a program or various items of data, and a communication unit 1009 including a LAN (Local Area Network) adaptor etc. which performs a communication process through a network typified by the Internet, are connected to the input/output interface 1005. Also, connected is a drive 1010 which reads and writes data from and to a removable recording medium 1011, such as a magnetic disk (including a flexible disk), an optical disk (including a CD-ROM (Compact Disc-Read Only Memory) and a DVD (Digital Versatile Disc)), an magneto-optical disk (including an MD (Mini Disc)), or a semiconductor memory, etc.

The CPU 1001 executes various processes according to a program stored in the ROM 1002 or a program which is read from the removable medium 1011, such as a magnetic disk, an optical disk, a magneto-optical disk, or a semiconductor memory, etc., is installed in the storage unit 1008, and is loaded from the storage unit 1008 to the RAM 1003. The RAM 1003 also stores data which is necessary when the CPU 1001 executes various processes, etc., as appropriate.

In the computer configured as described above, the CPU 1001 loads a program that is stored, for example, in the storage unit 1008 onto the RAM 1003 via the input/output interface 1005 and the bus 1004, and executes the program. Thus, the above-described series of processing is performed.

Programs to be executed by the computer (the CPU 1001) are provided being recorded in the removable medium 1011 which is a packaged medium or the like. Also, programs may be provided via a wired or wireless transmission medium, such as a local area network, the Internet or digital satellite broadcasting.

In the computer, by inserting the removable medium 1011 into the drive 1010, the program can be installed in the storage unit 1008 via the input/output interface 1005. Further, the program can be received by the communication unit 1009 via a wired or wireless transmission medium and installed in the storage unit 1008. Moreover, the program can be installed in advance in the ROM 1002 or the storage unit 1008.

It should be noted that the program executed by a computer may be a program that is processed in time series according to the sequence described in this specification or a program that is processed in parallel or at necessary timing such as upon calling.

Note that the personal computer in FIG. 23 corresponds to the switcher apparatus 11, and the CPU 1001 corresponds to the control section 31.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above-mentioned flow charts can be executed by one apparatus or by allocating a plurality of apparatuses.

In addition, in the case where a plurality of processes are included in one step, the plurality of processes included in this one step can be executed by one apparatus or by sharing a plurality of apparatuses.

Additionally, the present technology may also have been configured as below.

<1>

An information processing apparatus including:

a control section that specifies, on a basis of a table set in which timing information, position information indicating a position of a subject, and camerawork information indicating camerawork are associated, camerawork corresponding to current timing information indicating a current time of image capture and current position information indicating a current position of the subject, and controls the camerawork of an image capture apparatus that captures the subject according to the specified camerawork.

<2>

The information processing apparatus according to <1>, in which the table set is provided in correspondence with each of a plurality of image capture apparatuses, and the control section controls the camerawork of each image capture apparatus by using a table set for each of the plurality of image capture apparatuses.

<3>

The information processing apparatus according to <1> or <2>, in which the table set is provided for each image capture target, and the control section selectively uses a table set corresponding to the image capture target.

<4>

The information processing apparatus according to <3>, in which the control section selectively uses any of a plurality of table sets set with respect to a same image capture target, on a basis of condition information indicating a condition of the image capture target.

<5>

The information processing apparatus according to <4>, in which the condition information is stats information in a case in which the image capture target is a sports broadcast, and is a musical score in a case in which the image capture target is a live music performance.

<6>

The information processing apparatus according to any of <1> to <5>, in which in a case in which position information corresponding to the current position information does not exist in the table set, the control section uses a plurality of position information corresponding to positions neighboring the current position information to interpolate position information corresponding to the current position information.

<7>

The information processing apparatus according to any of <1> to <6>, in which the position information indicates a position in a three-dimensional space.

<8>

The information processing apparatus according to any of <1> to <7>, in which the camerawork control information is information that controls any of a pan, a tilt, and a zoom of the image capture apparatus.

<9>

The information processing apparatus according to any of <1> to <8>, in which in a case in which the subject is recognized from an image captured by the image capture apparatus, and a position of the subject indicated by the camerawork information does not match a recognized position of the subject, the control section corrects the specified camerawork on a basis of the image captured by the image captured apparatus.

<10>

An information processing method including:

a step of specifying, on a basis of a table set in which timing information, position information indicating a position of a subject, and camerawork information indicating camerawork are associated, camerawork corresponding to current timing information indicating a current time of image capture and current position information indicating a current position of the subject, and controlling the camerawork of an image capture apparatus that captures the subject according to the specified camerawork.

<11>

A program causing a computer to execute a process including:

a control section that specifies, on a basis of a table set in which timing information, position information indicating a position of a subject, and camerawork information indicating camerawork are associated, camerawork corresponding to current timing information indicating a current time of image capture and current position information indicating a current position of the subject, and controls the camerawork of an image capture apparatus that captures the subject according to the specified camerawork.

REFERENCE SIGNS LIST 1 robot camera control system
11 switcher apparatus
12 reception section
13 external information supply section
14, 14-1 to 14-n robot camera
15 manual camera
16, 16-1 to 16-m sensor apparatus
31 control section
32 position information acquisition section
33 external information acquisition section
34 storage section
35 camerawork control information transmission section
36 image reception section
37 timing information acquisition section
51 camerawork control information generation section
52 image acquisition management section
71 camerawork information table set storage section
72 image data storage section
91 camerawork control information reception section
92 control section
93 image capture control section
94 image capture section
95 image acquisition section
96 image transmission section
111 operation section
112 control section
113 image capture control section
114 image capture section
115 image acquisition section
116 image transmission section
131 position information detection section
132 storage section
133 position computation section
134 communication section
191, 211 camerawork control information generation section

The invention claimed is:

1. An information processing apparatus, comprising:
processing circuitry configured to:
obtain a table set that includes timing information, position information indicating various possible positions of a subject for each timing designated in the timing information, and camerawork control information in association with one another;
identify a piece of the camerawork control information from the table set for a particular image capture apparatus, the piece of the camerawork control information being registered in the table set in association with a particular timing designated in the timing information that corresponds to a current time and a particular position for the particular timing indicated in the position information that corresponds to a current position of the subject; and
control the particular image capture apparatus to capture an image of the subject according to the identified piece of the camerawork control information.

2. The information processing apparatus according to claim 1, wherein the processing circuitry is configured to:
obtain the table set from a plurality of table sets that each corresponds to a respective image capture apparatus of a plurality of image capture apparatuses; and
control camerawork of each image capture apparatus of the plurality of image capture apparatuses by using a corresponding table set of the plurality of table sets.

3. The information processing apparatus according to claim 1, wherein the processing circuitry is configured to:
obtain the table set from a plurality of table sets that each corresponds to a respective composition setting of a plurality of composition settings for an image capture target.

4. The information processing apparatus according to claim 3, wherein the processing circuitry is configured to:
select the table set from the plurality of table sets on a basis of condition information indicating a condition of the image capture target.

5. The information processing apparatus according to claim 4, wherein
the condition information is stats information in a case in which the image capture target is a sports broadcast, and is a musical score in a case in which the image capture target is a live music performance.

6. The information processing apparatus according to claim 1, wherein the processing circuitry is configured to:
in a case in which the particular position corresponding to the current position of the subject does not exist in the table set, generate the piece of the camerawork control information by interpolating pieces of the camerawork control information in the table set that are in association with possible positions for the particular timing indicated in the position information that are neighboring the current position of the subject.

7. The information processing apparatus according to claim 1, wherein
the position information indicates the various possible positions in a three-dimensional space.

8. The information processing apparatus according to claim 1, wherein
the piece of the camerawork control information includes information for controlling one or more of a pan, a tilt, and a zoom of the particular image capture apparatus.

9. The information processing apparatus according to claim 1, wherein the processing circuitry is configured to:
in a case in which the subject is recognized from the image captured by the particular image capture apparatus, and a composition of the image with respect to the subject does not match an anticipated composition, adjust the identified piece of the control information such that an updated image captured by the particular image capture apparatus has an updated composition matching the anticipated composition.

10. An information processing method, comprising:
obtaining a table set that includes timing information, position information indicating various possible positions of a subject for each timing designated in the timing information, and camerawork control information in association with one another;
identifying a piece of the camerawork control information from the table set for a particular image capture apparatus, the piece of the camerawork control information being registered in the table set in association with a particular timing designated in the timing information that corresponds to a current time and a particular position for the particular timing indicated in the position information that corresponds to a current position of the subject; and controlling the particular image capture apparatus to capture an image of the subject according to the identified piece of the camerawork control information.

11. A non-transitory computer-readable storage medium storing instructions which when executed by a computer causes the computer to perform:

obtaining a table set that includes timing information, position information indicating various possible positions of a subject for each timing designated in the timing information, and camerawork control information in association with one another;

identifying a piece of the camerawork control information from the table set for a particular image capture apparatus, the piece of the camerawork control information being registered in the table set in association with a particular timing designated in the timing information that corresponds to a current time and a particular position for the particular timing indicated in the position information that corresponds to a current position of the subject; and controlling the particular image capture apparatus to capture an image of the subject according to the identified piece of the camerawork control information.

* * * * *